United States Patent
Sun et al.

(10) Patent No.: US 11,334,162 B2
(45) Date of Patent: May 17, 2022

(54) TACTILE SENSATION PROVIDING DEVICE AND METHOD

(71) Applicant: JILIN UNIVERSITY, Changchun (CN)

(72) Inventors: Xiaoying Sun, Changchun (CN); Guohong Liu, Changchun (CN); Qinglong Wang, Changchun (CN); Jian Chen, Changchun (CN); Xuezhi Yan, Changchun (CN); Chen Zhang, Changchun (CN)

(73) Assignee: JILIN UNIVERSITY, Changchun (CN)

(*) Notice: Subject to any disclaimer, the term of this patent is extended or adjusted under 35 U.S.C. 154(b) by 0 days.

(21) Appl. No.: 16/644,874

(22) PCT Filed: Oct. 10, 2018

(86) PCT No.: PCT/CN2018/109627
§ 371 (c)(1),
(2) Date: Mar. 5, 2020

(87) PCT Pub. No.: WO2020/037790
PCT Pub. Date: Feb. 27, 2020

(65) Prior Publication Data
US 2021/0165491 A1 Jun. 3, 2021

(30) Foreign Application Priority Data
Aug. 24, 2018 (CN) .......................... 201810978283.5

(51) Int. Cl.
*G06T 7/64* (2017.01)
*G06F 3/01* (2006.01)
*G06T 7/90* (2017.01)
*G06T 7/40* (2017.01)
*H04N 1/56* (2006.01)

(52) U.S. Cl.
CPC ................ *G06F 3/016* (2013.01); *G06T 7/40* (2013.01); *G06T 7/64* (2017.01); *G06T 7/90* (2017.01);
(Continued)

(58) Field of Classification Search
CPC ..................... G06F 3/016; G06F 3/041; G06F 2203/04105; G06T 7/40; G06T 7/64; G06T 7/90; G06T 2207/10024; H04N 1/56
(Continued)

(56) References Cited

U.S. PATENT DOCUMENTS

| 10,303,187 B1* | 5/2019 | McNamara ......... G06Q 10/087 |
| 2012/0016472 A1* | 1/2012 | Chen .................. G09B 21/003 623/4.1 |

(Continued)

FOREIGN PATENT DOCUMENTS

| CN | 101819462 A | 9/2010 |
| CN | 104063054 A | 9/2014 |
| CN | 107943290 A | 4/2018 |

OTHER PUBLICATIONS

Reseach on Multi-Mode Haptic Display Based on Image, Information Science, China Doctoral Dissertations Full-Text Database. No. 09, ISSN: 1674-022X, pp. 57-64 and 70-75 (2017).
(Continued)

*Primary Examiner* — Ali Bayat
(74) *Attorney, Agent, or Firm* — Marshall, Gerstein & Borun LLP

(57) ABSTRACT

A tactile sensation providing method and device. The tactile sensation providing method includes: generating a first tactile sensation based on information of a contour attribute of a visual object; generating a second tactile sensation based on information of a texture attribute of the visual object; and generating a third tactile sensation based on information of a roughness attribute of the visual object.

19 Claims, 4 Drawing Sheets

(52) U.S. Cl.
CPC ..... *H04N 1/56* (2013.01); *G06T 2207/10024* (2013.01)

(58) Field of Classification Search
USPC .......................................................... 382/108
See application file for complete search history.

(56) References Cited

U.S. PATENT DOCUMENTS

| | | | | |
|---|---|---|---|---|
| 2012/0286944 | A1* | 11/2012 | Forutanpour | G06F 3/016 340/407.1 |
| 2012/0327006 | A1* | 12/2012 | Israr | G06F 3/016 345/173 |
| 2015/0185849 | A1* | 7/2015 | Levesque | G06F 3/011 340/636.1 |
| 2016/0025615 | A1* | 1/2016 | Fishel | G01N 19/00 702/33 |
| 2016/0246375 | A1* | 8/2016 | Rihn | G06F 3/04886 |
| 2017/0128148 | A1 | 5/2017 | Johnson et al. | |

OTHER PUBLICATIONS

International Search Report for Application No. PCT/CN2018/109627, dated May 23, 2019.

G. Liu, et al., "Tri-Modal Tactile Display and Its Application Into Tactile Perception of Visualized Surfaces," *IEEE Transactions of Haptics*, vol. 13, No. 4, pp. 733-744 (2020).

\* cited by examiner

TACTILE SENSATION PROVIDING DEVICE AND METHOD

CROSS-REFERENCE TO RELATED APPLICATION

The present application claims priority to Chinese Patent Application No. 201810978283.5, filed on Aug. 24, 2018, and titled "tactile sensation reproduction method and device fusing electrostatic force, air squeeze-film and mechanical vibration", the disclosure of which is incorporated herein by reference in its entirety as part of the present application.

TECHNICAL FIELD

The embodiments of the present disclosure relate to a tactile sensation providing device and method.

BACKGROUND

Smart phones, tablet computers and so on with a tactile sensation reproduction function have a wide application prospect in health care, e-commerce, education and entertainment, visually impaired people and so on. With the aid of the tactile sensation reproduction technology, the shape, texture, roughness, flexibility and other surface characteristics of the displayed object can be perceived by touching a multimedia terminal screen with bare fingers, and this greatly improves the reality of interactive processes and the richness of interactive experience. In a tactile sensation reproduction equipment, the dynamic range and dimension of tactile feedback force, and the tactile perception method are two key factors determining the reality of tactile sensation reproduction of visual objects on a touch screen.

SUMMARY

At least one embodiment of the present disclosure provides a tactile sensation providing method, which includes: generating a first tactile sensation based on information of a contour attribute of a visual object; generating a second tactile sensation based on information of a texture attribute of the visual object; and generating a third tactile sensation based on information of a roughness attribute of the visual object.

For example, the tactile sensation providing method according to at least one embodiment of the present disclosure further includes:
obtaining the information of the contour attribute, the information of the texture attribute and the information of the roughness attribute of the visual object based on color information of the visual object.

For example, in the tactile sensation providing method according to at least one embodiment of the present disclosure, the obtaining the information of the contour attribute, the information of the texture attribute and the information of the roughness attribute of the visual object based on the color information of the visual object includes:
converting each pixel of the visual object from an RGB color model to an HSI color model by equations (1) to (4):

$$H = \begin{cases} \varpi & B \le G \\ 2\pi - \varpi & B > G \end{cases} \quad (1)$$

$$S = 1 - \frac{3}{R+G+B}[\min(R, G, B)] \quad (2)$$

$$I = \frac{1}{3}(R+G+B) \quad (3)$$

where R is a red color value, G is a green color value, and B is a blue color value, H is hue, S is saturation, I is brightness, $\varpi$ and is a radian for partition of different main hues, $$\varpi = \arccos\left\{\frac{(R-G)+(R-B)}{2[(R-G)^2+(R-G)(G-B)]^{1/2}}\right\}; \quad (4)$$

calculating a gradient matrix P by using the brightness I as a height matrix $H_{EI}$, wherein an element in an xth row and a yth column of the gradient matrix P is expressed as:

$$P(x,y) = \sqrt{[\Delta_x H_{EI}(x,y)]^2 + [\Delta_y H_{EI}(x,y)]^2}$$

where $\Delta_x$ and $\Delta_y$ are partial derivatives of the height matrix $H_{EI}$ with respect to x and y, respectively, $H_{EI}$ (x, y) is an element in an xth row and a yth column of the height matrix $H_{EI}$, $1 \le x \le M$, $1 \le y \le N$, M is a number of pixel rows of the visual object, and N is a number of pixel columns of the visual object;
calculating a texture height matrix $H_T$ associated with the texture attribute and a contour gradient matrix $P_C$ associated with the contour attribute, wherein elements in an xth row and a yth column of the texture height matrix $H_T$ and the contour gradient matrix $P_C$ are expressed respectively as:

$$H_T(x, y) = H_{EI}(x, y) \odot S_M(x, y)$$

$$P_C(x, y) = P(x, y)$$

$$P(x, y) \odot S_M(x, y)$$

wherein $$S_M(x, y) = \begin{cases} 0 & P(x, y) > p \\ 1 & P(x, y) \le p \end{cases}$$

where $S_M(x, y)$ is an element in an xth row and a yth column of a matrix $S_M$ for differentiation of contour and texture gradients, symbol $\odot$ is a Schur operation, and P is an empirical gradient value for differentiation of the contour attribute and the texture attribute; and
obtaining, based on the texture height matrix $H_T$, a curvature matrix C associated with texture and roughness attributes by using a curvature convolution kernel, wherein an element in an xth row and a yth column of the curvature matrix C is calculated as:

$$C(x, y) = \frac{LW - K^2}{EQ - Z^2}$$

where E, Q and Z are first-order convolution kernel coefficients of an element $H_T(x, y)$ in an xth row and a yth column of the texture height matrix, and L, W and K are second-order convolution kernel coefficients of the element $H_T(x, y)$ in the xth row and the yth column of the texture height matrix $H_T$.

For example, in the tactile sensation providing method according to at least one embodiment of the present disclosure, the generating the first tactile sensation based on information of the contour attribute of the visual object includes:

generating the first tactile sensation by an electrostatic force, an air squeeze-film effect and a mechanical vibration, based on the information of the contour attribute of the visual object.

For example, in the tactile sensation providing method according to at least one embodiment of the present disclosure, the generating the second tactile sensation based on the information of the texture attribute of the visual object includes:

generating the second tactile sensation by an electrostatic force and a mechanical vibration, based on the information of the texture attribute of the visual object.

For example, in the tactile sensation providing method according to at least one embodiment of the present disclosure, the generating the third tactile sensation based on the information of the roughness attribute of the visual object includes:

generating the third tactile sensation by an electrostatic force, based on the information of the roughness attribute of the visual object.

For example, in the tactile sensation providing method according to at least one embodiment of the present disclosure, the generating the first tactile sensation by the electrostatic force, the air squeeze-film effect and the mechanical vibration, based on the information of the contour attribute of the visual object includes:

determining an amplitude of a first driving signal for generating the electrostatic force, an amplitude of a second driving signal for generating the air squeeze-film effect, and an amplitude of a third driving signal for generating the mechanical vibration, based on the information of the contour attribute of the visual object; and generating the electrostatic force by the first driving signal, generating the air squeeze-film effect by the second driving signal, and generating the mechanical vibration by the third driving signal, so as to generate the first tactile sensation.

For example, in the tactile sensation providing method according to at least one embodiment of the present disclosure, the generating the second tactile sensation by the electrostatic force and the mechanical vibration, based on the information of the texture attribute of the visual object includes:

determining an amplitude of a fourth driving signal for generating the electrostatic force and an amplitude of a fifth driving signal for generating the mechanical vibration, based on the information of the texture attribute of the visual object; and generating the electrostatic force by the fourth driving signal and generating the mechanical vibration by the fifth driving signal, so as to generate the second tactile sensation.

For example, in the tactile sensation providing method according to at least one embodiment of the present disclosure, the generating the third tactile sensation by the electrostatic force, based on the information of the roughness attribute of the visual object includes:

determining a frequency of a driving signal for generating the electrostatic force, based on the information of the roughness attribute of the visual object; and generating the electrostatic force by the driving signal, so as to generate the third tactile sensation.

For example, in the tactile sensation providing method according to at least one embodiment of the present disclosure, the determining the amplitude of the first driving signal for generating the electrostatic force, the amplitude of the second driving signal for generating the air squeeze-film effect, and the amplitude of the third driving signal for generating the mechanical vibration, based on the information of the contour attribute of the visual object includes:

normalizing the contour gradient matrix $P_C$ to obtain a normalized contour gradient matrix $P_N$, wherein an element in an xth row and a yth column of the normalized contour gradient matrix $P_N$ is calculated as:

$$P_N(x, y) = \frac{P_C(x, y) - p_{min}}{p_{max} - p_{min}}$$

where $P_C(x, y)$ is an element in an xth row and a yth column of the contour gradient matrix $P_C$, $p_{x\ min}$ is a minimum value of elements in the contour gradient matrix $P_C$, $P_{xmax}$ is a maximum value of elements in the contour gradient matrix $P_C$, $1 \leq x \leq M$, $1 \leq y \leq N$;

calculating a tangential force matrix $F_x$ based on the normalized gradient matrix $P_N$, wherein an element in an xth row and a yth column of the tangential force matrix $F_x$ is calculated as:

$$F_x(x,y)=(f_o-f_a)+P_N(x,y)(f_e+f_a)$$

where $f_o$ is a tangential force received by a finger when the finger sweeps over a device screen without applying tactile feedback, $f_e$ is a maximum tangential force which is capable of being increased by the electrostatic tactile sensation, and $f_a$ is a maximum tangential force which is capable of being decreased by the air squeeze-film tactile sensation;

decomposing the tangential force matrix $F_x$ into an electrostatic force matrix $F_{xE}$ and an air squeeze-film force matrix $F_{xA}$, wherein elements in an xth row and a yth column of the electrostatic force matrix $F_{xE}$ and the air squeeze-film force matrix $F_{xA}$ are calculated respectively as:

$$F_{xE}(x, y) = \begin{cases} F_x(x, y) - f_o & F_x(x, y) > f_o \\ 0 & F_x(x, y) \leq f_o \end{cases}$$

$$F_{xA}(x, y) = \begin{cases} f_o - F_x(x, y) & F_x(x, y) < f_o \\ 0 & F_x(x, y) \geq f_o \end{cases};$$

calculating an amplitude matrix $A_{mpE1}$ of the first driving signal for generating the electrostatic force based on the electrostatic force matrix $F_{xE}$, wherein an element in an xth row and a yth column of the amplitude matrix $A_{mpE1}$ is calculated as:

$A_{mpE1}(x,y)=\sqrt{F_{xE}(x,y)/k_1}$, where $k_1$ is a first proportional coefficient;

calculating an amplitude matrix $A_{mpA}$ of the second driving signal for generating the air squeeze-film effect based on the air squeeze-film force matrix $F_{xA}$, wherein an element in an xth row and a yth column of the amplitude matrix $A_{mpA}$ is calculated as:

$A_{mpA}(x,y)=\sqrt{F_{xA}(x,y)/k_2}$, where $k_2$ is a second proportional coefficient;

calculating a normal force matrix $F_y$ based on the tangential force matrix $F_x$, wherein an element in an xth row and a yth column of the normal force matrix $F_y$ is calculated as:

$$F_y(x,y) = F_x(x,y)\tan\theta(x,y)$$

where $\theta(x, y)$ represents an angle between a horizontal plane and a resultant force of a supporting force and friction that are received by a finger at a point $D(x, y)$ of the visual object when the finger touches the point, and is calculated by a following formula:

$$\theta(x,y) = 90 - \alpha(x,y) - \arctan\mu$$

where $\alpha(x, y)$ is calculated as $$\alpha(x, y) = \frac{P_C(x, y)}{225} \times 90°,$$

$\mu$ is a surface friction coefficient of the visual object; and calculating an amplitude matrix $A_{mpV1}$ of the third driving signal for generating the mechanical vibration based on the normal force matrix $F_y$, wherein an element in an xth row and a yth column of the amplitude matrix $A_{mpV1}$ is calculated as:

$$A_{mpV1}(x,y) = \sqrt{F_y(x,y)/k_3},$$ where $k_3$ is a third proportional coefficient.

For example, in the tactile sensation providing method according to at least one embodiment of the present disclosure, the determining the amplitude of the fourth driving signal for generating the electrostatic force and the amplitude of the fifth driving signal for generating the mechanical vibration, based on the information of the texture attribute of the visual object includes:

normalizing the curvature matrix $C$ to obtain a normalized curvature matrix $C_N$, wherein an element in an xth row and a yth column of the normalized curvature matrix $C_N$ is calculated as:

$$C_N(x, y) = \frac{C(x, y) - c_{xmin}}{c_{xmax} - c_{xmin}}$$

where $C(x, y)$ is an element in an xth row and a yth column of the curvature matrix $C$, $c_{x\,min}$ is a minimum value of elements in the curvature matrix $C$, and $c_{xmax}$ is a maximum value of elements in the curvature matrix $C$;

calculating an amplitude matrix $A_{mpE2}$ of the fourth driving signal for generating the electrostatic force based on the normalized curvature matrix $C_N$, wherein an element in an xth row and a yth column of the amplitude matrix $A_{mpE2}$ is calculated as:

$$A_{mpE2}(x,y) = k_4 V_{E\,max}(1 - C_N(x,y))$$

where $V_{E\,max}$ is a maximum driving voltage which is capable of being provided by electrostatic tactile feedback, and $k_4$ is a fourth proportional coefficient;

normalizing the texture height matrix $H_T$ to obtain a normalized height matrix $H_N$, wherein an element in an xth row and a yth column of the normalized height matrix $H_N$ is calculated as:

$$H_N(x, y) = \frac{H_T(x, y) - h_{xmin}}{h_{xmax} - h_{xmin}}$$

where $H_T(x, y)$ is an element in an xth row and a yth column of the texture height matrix $H_T$, $h_{x\,min}$ is a minimum value of elements in the curvature matrix $H_T$, and $h_{xmax}$ is a maximum value of elements in the curvature matrix $H_T$; and calculating an amplitude matrix $A_{mpV2}$ of the fifth driving signal for generating the mechanical vibration based on the normalized height matrix $H_N$, wherein an element in an xth row and a yth column of the amplitude matrix $A_{mpV2}$ is calculated as:

$$A_{mpV2}(x,y) = k_6 V_{V\,max} H_N(x,y)$$

where $V_{V\,max}$ is a maximum driving voltage which is capable of being provided by vibration tactile feedback, and $k_6$ is a sixth proportional coefficient.

For example, in the tactile sensation providing method according to at least one embodiment of the present disclosure, the determining the frequency of the driving signal for generating the electrostatic force, based on the information of the roughness attribute of the visual object includes:

normalizing the curvature matrix $C$ to obtain a normalized curvature matrix $C_N$, wherein an element in an xth row and a yth column of the normalized curvature matrix $C_N$ is calculated as:

$$C_N(x, y) = \frac{C(x, y) - c_{xmin}}{c_{xmax} - c_{xmin}}$$

where $C(x, y)$ is an element in an xth row and a yth column of the curvature matrix $C$, $c_{x\,min}$ is a minimum value of elements in the curvature matrix $C$, and $c_{xmax}$ is a maximum value of elements in the curvature matrix $C$; and calculating a frequency matrix $F_{EC}$ of the driving signal for generating the electrostatic force based on the normalized curvature matrix $C_N$, wherein an element in an xth row and a yth column of the frequency matrix $F_{EC}$ is calculated as:

$$F_{EC}(x,y) = k_7 f_{E\,max} C_N(x,y)$$

where $f_{E\,max}$ is a highest frequency which is provided by electrostatic tactile feedback, and $k_7$ is a seventh proportional coefficient.

For example, in the tactile sensation providing method according to at least one embodiment of the present disclosure, the electrostatic force is provided by supplying a driving signal to an electrically conductive plate.

For example, in the tactile sensation providing method according to at least one embodiment of the present disclosure, the mechanical vibration is provided by supplying a driving signal to a vibrating element.

For example, in the tactile sensation providing method according to at least one embodiment of the present disclosure, the air squeeze-film effect is provided by supplying a driving signal to a piezoelectric element.

At least one embodiment of the present disclosure provides a tactile sensation providing device, which includes:

a tactile sensation providing unit, configured to generate a first tactile sensation based on information of contour attribute of a visual object; to generate a second tactile sensation based on information of texture attribute of the visual object; to generate a third tactile sensation based on information of roughness attribute of the visual object; and to provide a combination of the first tactile sensation, the second tactile sensation and the third tactile sensation;

a processing unit, generating a driving signal parameter based on the information of the contour attribute, the information of the texture attribute and the information of the toughness attribute of the visual object; and a driving unit, in a communication connection with the processing unit and the tactile sensation providing unit, and receiving the driving signal parameter from the processing unit, so as to generate a driving signal for driving the tactile sensation providing unit based on the driving signal parameter.

For example, in the tactile sensation providing device according to at least one embodiment of the present disclosure, the tactile sensation providing unit includes:

an electrostatic force element for generating an electrostatic force;

a piezoelectric element for generating an air squeeze-film effect; and a vibrating element for generating a mechanical vibration.

For example, in the tactile sensation providing device according to at least one embodiment of the present disclosure, the processing unit is configured to:

determine, based on contour attribute information of the visual object, an amplitude of a first driving signal for driving the electrostatic force element to generate the electrostatic force, an amplitude of a second driving signal for driving the piezoelectric element to generate the air squeeze-film effect and an amplitude of a third driving signal for driving the vibrating element to generate the mechanical vibration.

For example, in the tactile sensation providing device according to at least one embodiment of the present disclosure, the processing unit is configured to:

determine, based on the information of the texture attribute of the visual object, an amplitude of a fourth driving signal for driving the electrostatic force element to generate the electrostatic force and an amplitude of a fifth driving signal for driving the vibrating element to generate the mechanical vibration.

For example, in the tactile sensation providing device according to at least one embodiment of the present disclosure, the processing unit is configured to:

determine, based on the information of the roughness attribute of the visual object, a frequency of a driving signal for driving the electrostatic force element to generate the electrostatic force.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
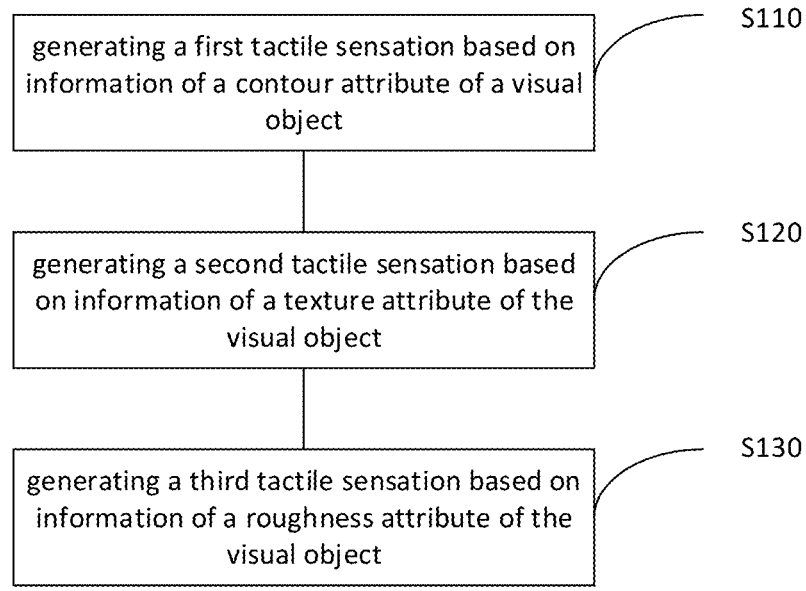
FIG. 1 is a flowchart illustrating a tactile sensation providing method according to some embodiments of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

With the target of improving reality of reproduced tactile sensations, devices and methods capable of realizing tactile sensation reproduction on a touch screen at present mainly include the following three types: a mechanical vibration type, an air squeeze-film type and an electrostatic force type.

For the tactile sensation reproduction of the mechanical vibration type, a device is enabled to vibrate by controlling a linear motor or the like to stimulate the operator's fingers, so as to present a tactile sensation.

For the tactile sensation reproduction of the air squeeze-film type, a thin air film is produced by applying high-frequency vibrations to a display screen so as to reduce tangential friction, thereby allowing the operator to perceive the tactile texture.

For the tactile sensation reproduction of the electrostatic force type, a capacitor is formed by using a finger and an electrode in a display screen, and an excitation signal is applied to the electrode so as to make the finger feel the change of electrostatic friction, thereby presenting a tactile sensation.

Realistic tactile sensation perception generally means that a tactile sensation reproduction device is capable of presenting a variety of surface properties of a visual object such as the contour, texture, roughness, flexibility, and the like at the same time. The inventors have found that a tactile sensation reproduction device and method based on a single feedback mechanism face the following two main challenges in terms of achieving combined tactile perception of multiple surface properties of a visual object: (1) both the range and dimension of a tactile feedback force of a tactile sensation reproduction device with the single tactile sensation reproduction mechanism requires being extended, and specifically speaking, mechanical vibration tactile sensation reproduction can only provide a feedback force in the normal direction, the air squeeze-film tactile sensation reproduction can only reduce the tangential friction on a touch screen, while the electrostatic tactile sensation reproduction can only increase the tangential friction on the touch screen; (2) with the restriction of the dynamic range and dimension of a single tactile sensation reproduction feedback force, existing rendering methods often only reproduce a certain surface characteristic of visual objects, and this affects the reality and richness of tactile sensation reproduction effect.

A tactile reproducing device and method fusing two tactile sensation reproduction mechanisms extend the range or dimension of a tactile feedback force, and improve the reality of tactile perception of visual objects to a certain extent. However, the inventors have found that the above-mentioned fusing technology still faces the following problems: (1) the tactile sensation reproduction technology fusing the electrostatic force with the air squeeze-film can only change the tangential friction on a touch screen, and lacks feedbacks in the normal direction, and although the tactile sensation reproduction technology fusing the electrostatic force with the mechanical vibration can provide a feedback force in the normal direction, the tangential friction on a touch screen just shows an increasing trend; (2) existing tactile rendering method based on a fusing device can realize tactile perception of two surface properties of a visual object simultaneously at most, and the reality of tactile sensation reproduction still requires being further improved.

According to at least one embodiment of the present disclosure, a tactile sensation providing method is provided, which includes: generating a first tactile sensation based on contour attribute information of a visual object; generating a second tactile sensation based on texture attribute information of the visual object; and generating a third tactile sensation based on roughness attribute information of the visual object.

As shown in FIG. 1, according to an embodiment of the present disclosure, there is provided a tactile sensation providing method 100, which includes:

S110, generating a first tactile sensation based on information of a contour attribute of a visual object;

S120, generating a second tactile sensation based on information of a texture attribute of the visual object;

S130, generating a third tactile sensation based on information of a roughness attribute of the visual object.

In some embodiments of the present disclosure, step S110 may include generating a first tactile sensation by use of an electrostatic force, an air squeeze-film effect and a mechanical vibration, based on the information of the contour attribute of the visual object. The first tactile sensation reflects the contour attribute of the visual object.

In some embodiments of the present disclosure, step S120 may include generating a second tactile sensation by use of an electrostatic force and a mechanical vibration, based on the information of the texture attribute of the visual object. The second tactile sensation reflects the texture attribute of the visual object.

In some embodiments of the present disclosure, step S130 may include generating a third tactile sensation by use of an electrostatic force, based on the information of the roughness attribute of the visual object. The third tactile sensation reflects the roughness attribute of the visual object.

In some embodiments of the present disclosure, an electrostatic force may be generated by supplying a driving signal to an electrically conductive plate. For example, the electrically conductive plate may be formed of metal, ITO, etc. The electrically conductive plate may be arranged on in or under a display screen, and the present disclosure has no limitation in this aspect. When a part of the operator's body, such as a finger, touches the display screen and is above the electrically conductive plate, a driving signal is supplied to the electrically conductive plate, charges can be induced in the tissue fluid of the finger and an electrostatic attraction is formed between the charges and the electrically conductive plate. When the finger moves on the display screen, the friction received by the finger changes, thereby generating a tactile sensation.

In some embodiments of the present disclosure, mechanical vibrations may be generated by supplying a driving signal to a vibrating element. For example, the vibrating element may be a motor, or the like. The driving signal is supplied to the vibrating element, so that the vibration element vibrates, and mechanical waves generated by the vibration of the vibrating element propagate on a surface of the display screen. Thus, a force generated by vibration of the display screen in the normal direction is perceived by a part of the operator's body, such as a finger, when the finger touches the display screen, and then a tactile sensation is produced.

In some embodiments of the present disclosure, an air squeeze-film effect may be generated by supplying a driving signal to a piezoelectric element. For example, the piezoelectric element may be a piezoelectric ceramic or the like. When a part of the operator's body, such as a finger, touches a display screen, a driving signal is supplied to the piezoelectric element, so as to cause the piezoelectric element to vibrate, and an air film is formed between the display screen and the finger. As a result, the friction received by the finger is decreased.

In some embodiments of the present disclosure, generating the first tactile sensation by use of the electrostatic force, the air squeeze-film effect and the mechanical vibration based on the information of the contour attribute of the visual object includes:

based on the information of the contour attribute of the visual object, determining an amplitude of a first driving signal for generating an electrostatic force, an amplitude of a second driving signal for generating the air squeeze-film effect, and an amplitude of a third driving signal for generating the mechanical vibration; and generating the electrostatic force by the first driving signal, generating the air squeeze-film effect by the second driving signal, and generating the mechanical vibration by the third driving signal, to generate the first tactile sensation.

In some embodiments of the present disclosure, generating the second tactile sensation by use of an electrostatic force and a mechanical vibration based on the information of the texture attribute of the visual object includes:

determining an amplitude of a fourth driving signal for generating the electrostatic force and an amplitude of a fifth driving signal for generating the mechanical vibration, based on the information of the texture attribute of the visual object; and generating the electrostatic force by the fourth driving signal and generating the mechanical vibration by the fifth driving signal, so as to generate the second tactile sensation.

In some embodiments of the present disclosure, generating the third tactile sensation by use of the electrostatic force based on the information of the roughness attribute of the visual object may include:

determining a frequency of a driving signal for generating the electrostatic force, based on the information of the roughness attribute of the visual object; and generating the electrostatic force by the driving signal, so as to generate the third tactile sensation.

The tactile sensation providing method according to some embodiments of the present disclosure may further include obtaining the information of the contour attribute, the information of the texture attribute and the information of the roughness attribute of the visual object based on color information of the visual object.

In some embodiments of the present disclosure, obtaining the information of the contour attribute, the information of the texture attribute and the information of the roughness attribute of the visual object based on the color information of the visual object includes:

converting each pixel of the visual object from a RGB color model to a HSI color model by use of equations (1) to (4):

$$H = \begin{cases} \varpi & B \leq G \\ 2\pi - \varpi & B > G \end{cases} \quad (1)$$

$$S = 1 - \frac{3}{R+G+B}[\min(R, G, B)] \quad (2)$$

$$I = \frac{1}{3}(R + G + B) \quad (3)$$

where R is a red color value, G is a green color value, and B is a blue color value, H is hue, S is saturation, I is brightness, and $\overline{\varpi}$ is a radian for partition of different main hues, $$\varpi = \arccos\left\{\frac{(R-G)+(R-B)}{2[(R-G)^2+(R-G)(G-B)]^{1/2}}\right\}; \quad (4)$$

using the brightness I as a height matrix $H_{EI}$ to calculate a gradient matrix P, an element in an xth row and yth column of the gradient matrix P being expressed as $$P(x,y)=\sqrt{[\Delta_x H_{EI}(x,y)]^2+[\Delta_y H_{EI}(x,y)]^2}$$

where $\Delta_x$ and $\Delta_y$ are partial derivatives of the height matrix $H_{EI}$ with respect to x and y, respectively, $H_{EI}(x, y)$ is an element in the xth row and yth column of the height matrix $H_{EI}$, $1 \leq x \leq M$, $1 \leq y \leq N$, M is the number of pixel rows of the visual object, and N is the number of pixel columns of the visual object;

calculating a texture height matrix $H_T$ associated with the texture attribute and a contour gradient matrix $P_C$ associated with the contour attribute, elements in the xth row and yth column of the texture height matrix $H_T$ and the contour gradient matrix $P_C$ being expressed respectively as:

$$H_T(x,y)=H_{EI}(x,y)\odot S_M(x,y)$$

$$P_C(x,y)=P(x,y)-P(x,y)\lfloor S_M(x,y)$$

where $$S_M(x, y) = \begin{cases} 0 & P(x, y) > p \\ 1 & P(x, y) \leq p \end{cases},$$

$S_M(x, y)$ is an element in the xth row and yth column of a matrix $S_M$ for differentiation of the contour and texture gradients, symbol $\odot$ is a Schur operation, and p is an empirical gradient value for differentiation of the contour attribute and the texture attribute;

obtaining, based on the texture height matrix $H_T$, a curvature matrix C associated with the texture and roughness attributes by using a curvature convolution kernel, an element in the xth row and yth column of the curvature matrix C being calculated as:

$$C(x, y) = \frac{LW - K^2}{EQ - Z^2}$$

where E, Q and Z are first-order convolution kernel coefficients of an element $H_T(x, y)$ in the xth row and yth column of the texture height matrix, and L, W and K are second-order convolution kernel coefficients of the element $H_T(x, y)$ in the xth row and yth column of the texture height matrix $H_T$.

In some embodiments of the present disclosure, determining an amplitude of the first driving signal for generating the electrostatic force, an amplitude of the second driving signal for generating the air squeeze-film effect, and an amplitude of the third driving signal for generating the mechanical vibration based on the information of the contour attribute of the visual object includes:

normalizing the contour gradient matrix $P_C$ to obtain a normalized contour gradient matrix $P_N$, an element in the xth row and yth column of the normalized contour gradient matrix $P_N$ being calculated as $$P_N(x, y) = \frac{P_C(x, y) - p_{min}}{p_{max} - p_{min}}$$

where $P_C(x, y)$ is an element in the xth row and yth column of the contour gradient matrix $P_C$, $p_{x\ min}$ is the minimum value of elements in the contour gradient matrix $P_C$, $p_{x\ max}$ is the maximum value of elements in the contour gradient matrix $P_C$, $1 \leq x \leq M$, $1 \leq y \leq N$, M is the number of pixel rows of the visual object, and N is the number of pixel columns of the visual object;

calculating a tangential force matrix $F_x$ based on the normalized gradient matrix $P_N$, the (x, y)th element of the tangential force matrix $F_x$ being calculated as $$F_x(x,y) = (f_o - f_a) + P_N(x,y)(f_e + f_a)$$

where $f_o$ is a tangential force received by a finger when the finger sweeps over the device screen without application of tactile feedback, $f_e$ is the maximum tangential force that can be increased by the electrostatic tactile sensation, and $f_a$ is the maximum tangential force that can be decreased by the air squeeze-film tactile sensation;

decomposing the tangential force matrix $F_x$ into an electrostatic force matrix $F_{xE}$ and an air squeeze-film force matrix $F_{xA}$, elements in the xth row and yth column of the electrostatic force matrix $F_{xE}$ and the air squeeze-film force matrix $F_{xA}$ being calculated respectively as:

$$F_{xE}(x, y) = \begin{cases} F_x(x, y) - f_o & F_x(x, y) > f_o \\ 0 & F_x(x, y) \leq f_o \end{cases}$$

$$F_{xA}(x, y) = \begin{cases} f_o - F_x(x, y) & F_x(x, y) < f_o \\ 0 & F_x(x, y) \geq f_o \end{cases};$$

calculating an amplitude matrix $A_{mpE1}$ of a first driving signal used for generating an electrostatic force, based on the electrostatic force matrix $F_{xE}$, an element in the xth row and yth column of the amplitude matrix $A_{mPE1}$ being calculated as $$A_{mpE1}(x,y) = \sqrt{F_{xE}(x,y)/k_1},$$

where $k_1$ is a first proportional coefficient;

calculating an amplitude matrix $A_{mpA}$ of a second driving signal used for generating an air squeeze-film effect, based on the air squeeze-film force matrix $F_{xA}$, an element in the xth row and yth column of the amplitude matrix $A_{mpA}$ being calculated as:

$A_{mpA}(x,y) = \sqrt{F_{xA}(x,y)/k_2}$, where $k_2$ is a second proportional coefficient;

calculating a normal force matrix $F_y$ based on the tangential force matrix $F_x$, an element in the xth row and yth column of the normal force matrix $F_y$ being calculated as:

$$F_y(x,y) = F_x(x,y) \tan \theta(x,y)$$

where $\theta(x, y)$ represents an angle between a horizontal plane and a resultant force of a supporting force and friction that are received by a finger at a point D(x, y) of the visual object when the finger touches the point, and $\theta(x, y)$ is calculated by the following formula, $$\theta(x,y) = 90 - \alpha(x,y) - \arctan \mu$$

where $\alpha(x, y)$ is calculated as $$\alpha(x, y) = \frac{P_C(x, y)}{255} \times 90°,$$

$\mu$ is a surface friction coefficient of the visual object;

calculating based on the normal force matrix $F_y$, an amplitude matrix $A_{mpV1}$ of the third driving signal used for generating mechanical vibration, an element in the xth row and yth column of the amplitude matrix $A_{mpV1}$ being calculated as $$A_{mpV1}(x,y) = \sqrt{F_y(x,y)/k_3},$$

where $k_3$ is a third proportional coefficient.

The first proportional coefficient $k_1$ is a ratio of the tangential friction generated by an electrostatic force to the square of the amplitude of a driving signal for generating the electrostatic force. For example, in an embodiment, the first proportional factor $k_1$ is $4 \times 10^{-6}$.

The second proportional coefficient $k_2$ is a ratio of the tangential friction caused by air squeeze-film effect to the square of the amplitude of a driving signal that produces the air squeeze-film effect. For example, in an embodiment, the second proportional coefficient $k_2$ is $3 \times 10^{-5}$.

The third proportional coefficient $k_3$ is a ratio of a normal feedback force generated by mechanical vibration to the square of the amplitude of a driving signal for generating mechanical vibration. For example, in an embodiment, the third proportional coefficient $k_3$ is $3.7 \times 10^{-5}$.

In some embodiments of the present disclosure, determining the amplitude of the fourth driving signal for generating the electrostatic force and the amplitude of the fifth driving signal for generating the mechanical vibration based on the information of the texture attribute of a visual object includes:

C normalizing a curvature matrix C to obtain a normalized curvature matrix $C_N$, an element of which in the xth row and yth column being calculated as $$C_N(x, y) = \frac{C(x, y) - c_{xmin}}{c_{xmax} - c_{xmin}}$$

where C(x, y) is an element in the xth row and yth column of the curvature matrix C, $C_{xmin}$ is the minimum value of elements in the curvature matrix C, and $c_{x\ max}$ is the maximum value of elements in the curvature matrix C;

calculating, based on the normalized curvature matrix $C_N$, an amplitude matrix $A_{mpE2}$ of the fourth driving signal used for generating the electrostatic force, an element in the xth row and yth column of the amplitude matrix $A_{mpE2}$ being calculated as:

$$A_{mpE2}(x,y) = k_4 V_{E\ max}(1 - C_N(x,y))$$

where $V_{E\ max}$ is the maximum driving voltage which can be provided by the electrostatic tactile feedback, and $k_4$ is a fourth proportional coefficient;

normalizing a texture height matrix $H_T$ to obtain a normalized height matrix $H_N$, an element of which in the xth row and yth column being calculated as:

$$H_N(x, y) = \frac{H_T(x, y) - h_{xmin}}{h_{xmax} - h_{xmin}}$$

where $H_T(x, y)$ is an element in the xth row and yth column of the texture height matrix $H_T$, $h_{x\ min}$ is the minimum value of elements in the curvature matrix $H_T$, and $h_{x\ max}$ is the maximum value of elements in the curvature matrix $H_T$;

calculating, based on the normalized height matrix $H_N$, an amplitude matrix $A_{mpV2}$ of the fifth driving signal used for generating mechanical vibration, an element in the xth row and yth column of the amplitude matrix $A_{mpV2}$ being calculated as:

$$A_{mpV2}(x,y)=k_6 V_{V\,max} H_N(x,y)$$

where $V_{V\,max}$ is the maximum driving voltage which can be provided by the vibration tactile feedback, and $k_6$ is a sixth proportional coefficient.

The fourth proportional coefficient $k_4$ is a proportional coefficient between the perception strength of the tangential friction generated by an electrostatic force and the amplitude of a driving signal for generating the electrostatic force. For example, in an embodiment, the fourth proportional coefficient $k_4$ is 0.21.

The sixth proportional coefficient $k_6$ is a proportional coefficient between the perception strength of the tangential friction generated by an electrostatic force and the frequency of a driving signal for generating the electrostatic force. For example, in an embodiment, the sixth proportional coefficient $k_6$ is −0.1.

In some embodiments of the present disclosure, determining the frequency of a driving signal for generating the electrostatic force based on the information of the roughness attribute of the visual object includes:

normalizing a curvature matrix C to obtain a normalized curvature matrix $C_N$, an element of which in the xth row and yth column being calculated as $$C_N(x,y) = \frac{C(x,y) - c_{xmin}}{c_{xmax} - c_{xmin}}$$

where C(x, y) is an element in the xth row and yth column of the curvature matrix C, $c_{x\,min}$ is the minimum value of elements in the curvature matrix C, and $c_{x\,max}$ is the maximum value of elements in the curvature matrix C; and calculating, based on the normalized curvature matrix $C_N$, a frequency matrix $F_{EC}$ of the driving signal for generating the electrostatic force, an element of the frequency matrix $F_{EC}$ in the xth row and yth column being calculated as $$F_{EC}(x,y)=k_7 f_{E\,max} C_N(x,y)$$

where $f_{E\,max}$ is the highest frequency which is provided by the electrostatic tactile feedback, and $k_7$ is a seventh proportional coefficient.

The seventh proportional coefficient $k_7$ is a proportional coefficient between the perception strength of a normal feedback force generated by mechanical vibration and the amplitude of a driving signal for generating mechanical vibration. For example, in an embodiment, the seventh proportional coefficient $K_7$ is −0.1.

According to the tactile sensation providing method provided by the embodiments of the present disclosure, the tangential friction can be increased by an electrostatic force, and can be decreased by an air squeeze-film effect, a feedback in the normal direction can be provided by mechanical vibration tactile feedback, and the tactile sensation fusing the electrostatic force, the air squeeze-film with the mechanical vibration is provided. The dynamic range of the tangential friction is extended by providing the electrostatic force and the air squeeze-film effect simultaneously, and the tactile feedback force in the normal direction is added by providing the mechanical vibration. Consequently, simultaneous extension of the dynamic range and dimensions of the tactile feedback force on the touch screen is realized. In addition, by the tactile sensation providing method provided by the embodiments of the present disclosure, contour tactile sensation reproduction is achieved by establishing a mapping model between the contour gradient information and the amplitudes of the driving signals for three kinds of tactile feedback (i.e. electrostatic force, air squeeze-film and mechanical vibration), texture tactile sensation reproduction is achieved by establishing mapping models between the texture curvature information and the amplitude of the driving signal for generating the electrostatic force, and between the texture height information and the amplitude of the driving signal used for generating the mechanical vibration, and the roughness tactile sensation reproduction is achieved by establishing a mapping model between the texture curvature information and the frequency parameter of the driving signal for generating the electrostatic force. As a result, the reality and richness of the tactile sensation are significantly improved.

Figure 2:
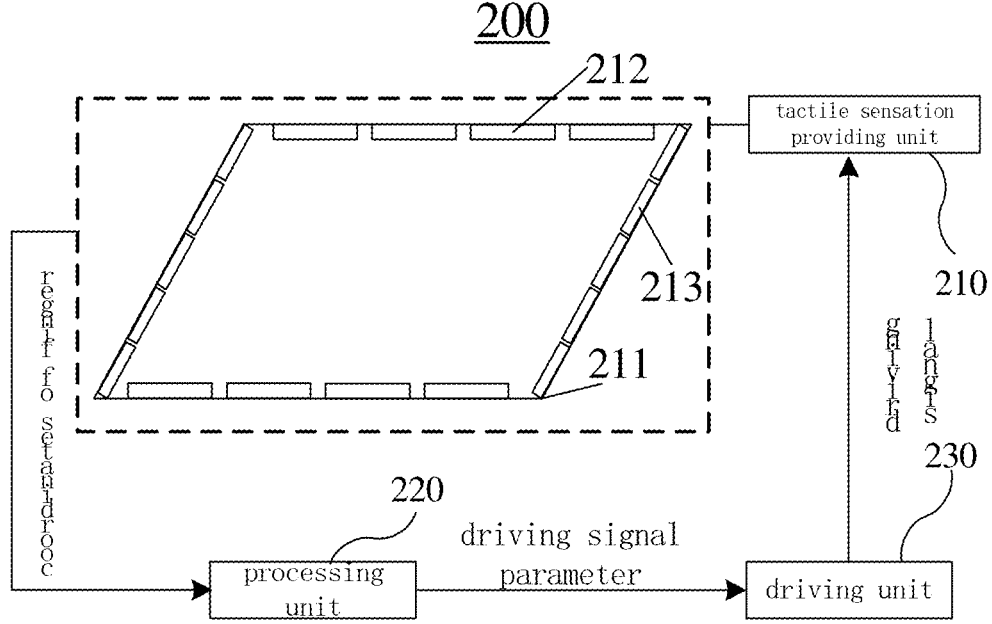
FIG. 2 is a structurally schematic view illustrating a tactile sensation providing device according to some embodiments of the present disclosure.

As shown in FIG. 2, a tactile sensation providing device 200 provided by at least one embodiment of the present disclosure includes:

a tactile sensation providing unit 210, configured to generate a first tactile sensation based on information of a contour attribute of a visual object; to generate a second tactile sensation based on information of a texture attribute of the visual object; to generate a third tactile sensation based on information of a roughness attribute of the visual object, and to provide a combination of the first tactile sensation, the second tactile sensation, and the third tactile sensation;

a processing unit 220, configured for generating a driving signal parameter based on the information of the contour attribute, the information of the texture attribute, and the information of the roughness attribute of the visual object; and a driving unit 230, configured to be in a communication connection with the processing unit 220 and the tactile sensation providing unit 210, and to receive the driving signal parameter from the processing unit 220, so as to generate a driving signal for driving the tactile sensation providing unit 210 based on the driving signal parameter.

In some embodiments of the present disclosure, the tactile sensation providing unit 210 may include an electrostatic force element for generating an electrostatic force, a piezoelectric element for generating an air squeeze-film effect, and a vibrating element for generating mechanical vibration.

The tactile sensation providing device provided by at least one embodiment of the present disclosure will be described in the present disclosure by taking an electrostatic force element disposed on a touch screen panel of a display screen as an example, but it could be understood by those skilled in the art that the present disclosure is not limited thereto. For example, the electrostatic force element may be provided separately, the electrostatic force element is disposed in a display panel, or the like. The touch screen panel may include, but is not limited to, a capacitive touch screen panel, a resistive touch screen panel, or the like. The touch screen panel may also track the position of a part of the operator in contact with the touch screen panel, such as a finger, on the touch screen panel in real time and transmit coordinates of the position to the processing unit 220. The electrostatic force element may receive a driving signal provided by the driving unit 230 and generate an electrostatic force based on the driving signal.

Figure 3:
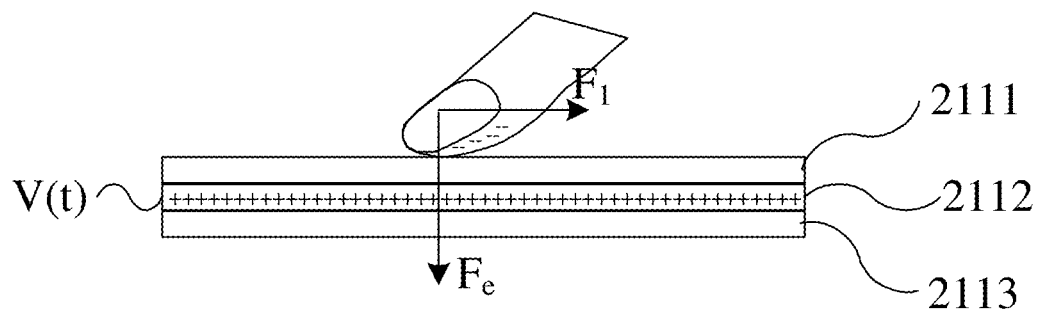
FIG. 3 is a force analysis diagram of an electrostatic tactile sensation according to some embodiments of the present disclosure.

The electrostatic force element may be, for example, an electrically conductive plate, and an electrostatic force is generated by supplying a driving signal to the electrically conductive plate. For example, the electrically conductive plate may be formed of metal, ITO, etc. When a part of the operator's body, such as a finger, touches the display screen and lies above the electrically conductive plate, a driving signal is supplied to the electrically conductive plate, charges can be induced in the tissue fluid of the finger and an electrostatic attraction is formed between the charges and the electrically conductive plate. When the finger moves on the display screen, the friction received by the finger changes, thereby generating a tactile sensation. A middle layer 2112 in FIG. 3 is an example of the electrostatic force element.

The vibrating element may be, for example, a motor or the like. The vibrating element is caused to vibrate by being supplied with a driving signal, and mechanical waves generated by the vibration of the vibrating element propagate on a surface of the display screen. Thus, a force in the normal direction generated by the vibration of the display screen is perceived by a finger when a part of the operator's body, such as the finger, touches the display screen, and then a tactile sensation is produced. A vibrating source 213 in FIG. 2 is an example of the vibrating element.

The piezoelectric element may be a piece of piezoelectric ceramic or the like. When a part of the operator's body, such as a finger, touches a display screen, a driving signal is supplied to the piezoelectric element, so as to cause the piezoelectric element to vibrate, and an air film is formed between the display screen and the finger. As a result, the friction received by the finger is decreased. A piezoelectric ceramic 212 in FIG. 2 is an example of the piezoelectric element.

The driving unit 230 can also be reused to achieve a tactile feedback function and a touch positioning function in a time-sharing manner.

FIG. 3 is a schematic structural diagram illustrating a touch screen panel 211 combined with a tactile sensation providing unit 210 of a tactile sensation providing device according to the embodiments of the present disclosure. As shown in FIG. 3, the touch screen panel 211 may be, for example, a single-point capacitive screen, and includes a bottom layer 2113, a middle layer 2112, and a top layer 2111. The bottom layer 2113 is used to support the touch screen panel, and can make the mechanical structure of the screen more stable, and the bottom layer 2113 may be formed of, for example, glass or other material. The middle layer 2112 is an electrically conductive plate, which may be formed on the bottom layer 2113 by spraying, sputtering or other processes, and may be applied with an excitation signal, and the middle layer 2112 may be at least partially transparent, for example, the middle layer 2112 may be transparent. The top layer 2111 is an insulating film, which is located on the middle layer 2112 and provides an insulating function. When a varying electrical signal is applied to the electrically conductive plate of the middle layer 2112, charges will be induced in the tissue liquid within a finger, and an electrostatic attraction Fe is produced between the charges and the electrically conductive plate. When the finger slides on the screen, the friction F 1 received by the finger changes, thereby generating a tactile sensation.

Figure 4:
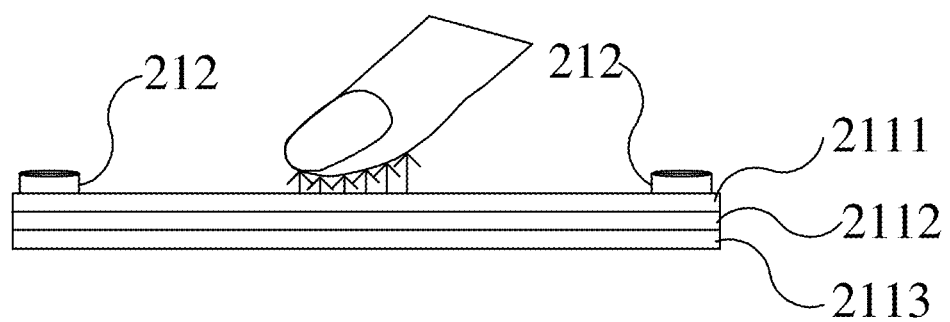
FIG. 4 is a force analysis diagram of an air squeeze-film tactile sensation according to some embodiments of the present disclosure.

The principle of changing the tangential force exerted on a finger by a piezoelectric ceramic 212 is shown in FIG. 4. The piezoelectric ceramic 212 brings the touch screen panel 211 to vibrate at a high frequency, so as to form an air film between the screen and the finger, and then the friction received by the finger is reduced.

Figure 5:
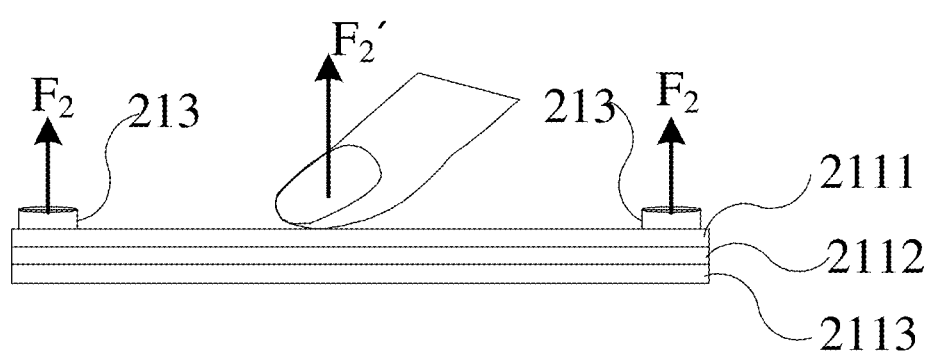
FIG. 5 is a force analysis diagram of a mechanical vibration tactile sensation according to some embodiments of the present disclosure.

The principle of changing by a vibrating source 213 the force in the normal direction received by a finger is shown in FIG. 5. The mechanical waves generated by the vibration of the vibrating source 213 propagate on a surface of the touch screen panel 211, and a force $F_2'$ in the normal direction produced by the screen vibration will be perceived by a finger when the finger touches the touch screen panel 211, thus generating a tactile sensation.

Figure 6:
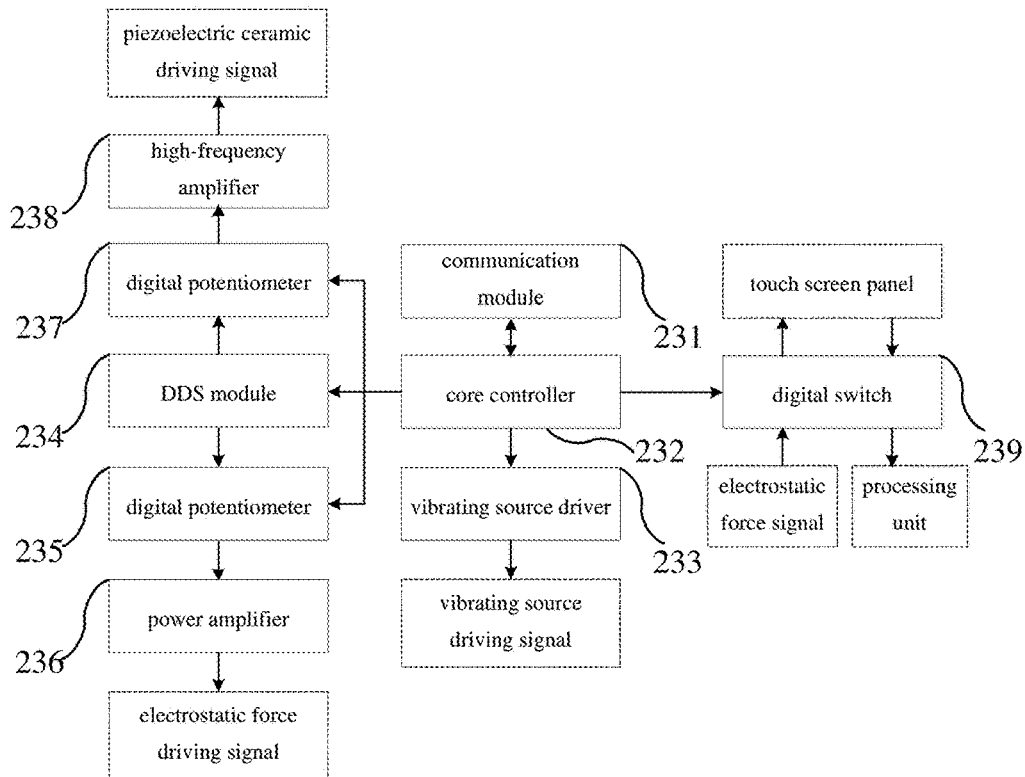
FIG. 6 is a structural block diagram of a driving unit according to some embodiments of the present disclosure.

The structure of the driving unit 230, as shown in FIG. 6, includes a core controller 232, which may receive a driving signal parameter of a host computer with the aid of a communication module 231, and control the working state of the whole system based on the parameter;

an electrostatic force driving module; according to the requirements of the electrostatic tactile sensation, the core controller 232 sends a control signal to a DDS (Direct Digital Synthesizer) so as to adjust the frequency and waveform of a driving signal, then the value of the amplitude of the signal can be adjusted by a digital potentiometer 235, finally, the amplitude of the signal is amplified by a power amplifier 236, and an electrostatic tactile sensation driving signal that meets the requirements can be generated;

an piezoelectric ceramic driving module; according to the requirements of the air squeeze-film tactile sensation, the core controller 232 sends a control signal to the DDS module 234 so as to adjust the frequency and waveform of a driving signal, then the value of the amplitude of the signal can be adjusted by a digital potentiometer 237, finally, the amplitude of the signal is amplified by a high-frequency amplifier 238, and an air squeeze-film tactile sensation driving signal that meets the requirements can be produced;

a mechanical vibration driving module, including a vibrating source driver 223; there will be a relatively large difference in the vibrating source driver based on different types of a vibrating source, so it is necessary to select a corresponding driving chip for the chosen vibrating source; the core controller 232 sends a corresponding control signal to the vibrating source driver 233, and a required mechanical vibration tactile sensation driving signal can be produced;

a positioning module; by means of controlling a digital switch 239, the core controller 232 controls the touch screen panel to be connected with the electrostatic force driving module or a processing unit, when the touch screen panel is connected with the electrostatic force driving module, the force received by a finger can be changed so as to provide a tactile feedback, and when the touch screen panel is connected with the processing unit, position information of the finger can be obtained. In this way, providing the tactile feedback and positioning are realized in a time-sharing manner.

The structural form of a tactile sensation providing device according to at least one embodiment of the present disclosure is shown in FIG. 2. A multimedia terminal lies at the bottom, a glass plate side 2113 of a touch screen panel 211 is adhered to a display panel of the multimedia terminal, vibrating sources 213 are, for example, symmetrically adhered to a set of opposite sides of the insulating film side 2111 of the touch screen panel 211, and piezoelectric ceramics 212 are, for example, symmetrically adhered to another set of opposite sides of the insulating film side 2111 of the touch screen panel 211.

In some embodiments of the present disclosure, the processing unit 220 is also used for obtaining the information of the contour attribute, the information of the texture attribute and the information of the roughness attribute of the visual object based on the color information of the visual object.

In an example of the present disclosure, the processing unit 220 may obtain the information of the contour attribute, the information of the texture attribute and the information of the roughness attribute of the visual object based on the color information of the visual object by the following steps.

converting visual information of each pixel of a visual object (including M×N pixels) from a RGB color model to a HSI color model by equations (1) to (4):

$$H = \begin{cases} \varpi & B \leq G \\ 2\pi - \varpi & B > G \end{cases} \quad (1)$$

$$S = 1 - \frac{3}{R+G+B}[\min(R, G, B)] \quad (2)$$

$$I = \frac{1}{3}(R + G + B) \quad (3)$$

where R is a red color value, G is a green color value, and B is a blue color value, H is a hue, S is saturation, I is brightness, and $\overline{\omega}$ is a radian for partition of different main hues, $$\varpi = \arccos\left\{\frac{(R-G)+(R-B)}{2[(R-G)^2+(R-G)(G-B)]^{1/2}}\right\} \quad (4)$$

using the obtained brightness information I as a height matrix $H_{EI}$ to calculate a gradient matrix P, an element in an xth row and yth column of the gradient matrix P being expressed as $$P(x,y) = \sqrt{[\Delta_x H_{EI}(x,y)]^2 + [\Delta_y H_{EI}(x,y)]^2}$$

where $\Delta_x$ and $\Delta_y$ are partial derivatives of the height matrix $H_{EI}$ with respect to x and y, respectively, $H_{EI}(x, y)$ is an element in the xth row and yth column of the height matrix $H_{EI}$, 1≤x≤M, 1≤y≤N, M is the number of pixel rows of the visual object, and N is the number of pixel columns of the visual object;

calculating a height matrix $H_T$ associated with the texture attribute and a gradient matrix $P_C$ associated with the contour attribute, elements in the xth row and yth column of the texture height matrix $H_T$ and the contour gradient matrix $P_C$ being expressed respectively as:

$$H_T(x,y) = H_{EI}(x,y) \odot S_M(x,y)$$

$$P_C(x,y) = P(x,y) - P(x,y) \lfloor S_M(x,y)$$

wherein $$S_M(x, y) = \begin{cases} 0 & P(x, y) > p \\ 1 & P(x, y) \leq p \end{cases}$$

where $S_M(x, y)$ is an element in the xth row and yth column of a matrix $S_M$ for differentiation of contour and texture gradients, symbol $\odot$ is the Schur operation, and P is an empirical gradient value for differentiation of the contour attribute and the texture attribute;

based on the texture height matrix $H_T$, obtaining a curvature matrix C associated with the texture and roughness attributes by using a curvature convolution kernel, an element in the xth row and yth column of the curvature matrix C being calculated as:

$$C(x, y) = \frac{LW - K^2}{EQ - Z^2}$$

where E, Q and Z are first-order convolution kernel coefficients of an element $H_T(x, y)$ in the xth row and yth column of the height matrix, and L, W and K are second-order convolution kernel coefficients of the element $H_T(x, y)$ in the xth row and yth column of the texture height matrix $H_T$.

In some embodiments of the present disclosure, the processing unit 220 is also configured to determine an amplitude of a first driving signal for generating the electrostatic force, an amplitude of a second driving signal for generating the air squeeze-film effect, and an amplitude of a third driving signal for generating the mechanical vibration, based on the information of the contour attribute of the visual object.

In an example of the present disclosure, the processing unit 220 may determine the amplitude of the first driving signal for generating the electrostatic force, the amplitude of the second driving signal for generating the air squeeze-film effect, and the amplitude of the third driving signal for generating the mechanical vibration based on the information of the contour attribute of the visual object by the following steps:

normalizing the contour gradient matrix $P_C$ to obtain a normalized contour gradient matrix $P_N$, an element in an xth row and yth column of the contour gradient matrix $P_N$ being calculated as $$P_N(x, y) = \frac{P_C(x, y) - p_{min}}{p_{max} - p_{min}}$$

where $P_C(x, y)$ is an element in the xth row and yth column of the contour gradient matrix $P_C$, $p_{x\ min}$ is the minimum value of elements in the contour gradient matrix $P_C$, $p_{x\ max}$ is the maximum value of elements in the contour gradient matrix $P_C$, 1≤x≤M, 1≤y≤N, M is the number of pixel rows of the visual object, and N is the number of pixel columns of the visual object;

calculating a tangential force matrix $F_x$ based on the normalized gradient matrix $P_N$, an element in the xth row and yth column of the tangential force matrix $F_x$ being calculated as $$F_x(x,y) = (f_o - f_a) + P_N(x,y)(f_e + f_a)$$

where $f_o$ is a tangential force received by a finger when the finger sweeps over the device screen without application of any tactile feedback, $f_e$ is the maximum tangential force as can be increased by the electrostatic tactile sensation, and $f_a$ is the maximum tangential force can be decreased by the air squeeze-film tactile sensation;

decomposing the tangential force matrix $F_x$ into an electrostatic force matrix $F_{xE}$ and an air squeeze-film force matrix $F_{xA}$, elements in an xth row and yth column of electrostatic force matrix $F_{xE}$ and the air squeeze film force matrix $F_{xA}$ being calculated respectively as:

$$F_{xE}(x, y) = \begin{cases} F_x(x, y) - f_o & F_x(x, y) > f_o \\ 0 & F_x(x, y) \leq f_o \end{cases}$$

-continued $$F_{xA}(x, y) = \begin{cases} f_o - F_x(x, y) & F_x(x, y) < f_o \\ 0 & F_x(x, y) \geq f_o \end{cases};$$

calculating based on the electrostatic force matrix $F_{xE}$ an amplitude matrix $A_{mpE1}$ of a first driving signal used for generating an electrostatic force, an element in an xth row and yth column of the amplitude matrix $A_{mpE1}$ being calculated as:

$$A_{mpE1}(x,y) = \sqrt{F_{xE}(x,y)/k_1}, \text{ where } k_1 \text{ is a first proportional coefficient;}$$

calculating based on the air squeeze-film force matrix $F_{xA}$ an amplitude matrix $A_{mpA}$ of a second driving signal used for generating an air squeeze-film effect, an element in an xth row and yth column of the amplitude matrix $A_{mpA}$ being calculated as:

$$A_{mpA}(x,y) = \sqrt{F_{xA}(x,y)/k_2}, \text{ where } k_2 \text{ is a second proportional coefficient;}$$

calculating a normal force matrix $F_y$ based on the tangential force matrix $F_x$, an element in an xth row and yth column of the normal force matrix $F_y$ being calculated as $$F_y(x,y) = F_x(x,y) \tan \theta(x,y)$$

where $\theta(x, y)$ represents an angle between a horizontal plane and a resultant force of a supporting force and the friction that are received by a finger at a point $D(x, y)$ of the visual object when the finger touches the point, and, and $\theta(x, y)$ is calculated by the following formula, $$\theta(x,y) = 90 - \alpha(x,y) - \arctan \mu$$

where $\alpha(x, y)$ is calculated as $$\alpha(x, y) = \frac{P_C(x, y)}{255} \times 90°,$$

$\mu$ is a surface friction coefficient of the visual object;

calculating based on the normal force matrix $F_y$ an amplitude matrix $A_{mpV1}$ of the third driving signal used for generating mechanical vibration, an element in an xth row and yth column of the amplitude matrix $A_{mpV1}$ being calculated as:

$$A_{mpV1}(x,y) = \sqrt{F_y(x,y)/k_3}$$

where $k_3$ is a third proportional coefficient.

Figure 9:
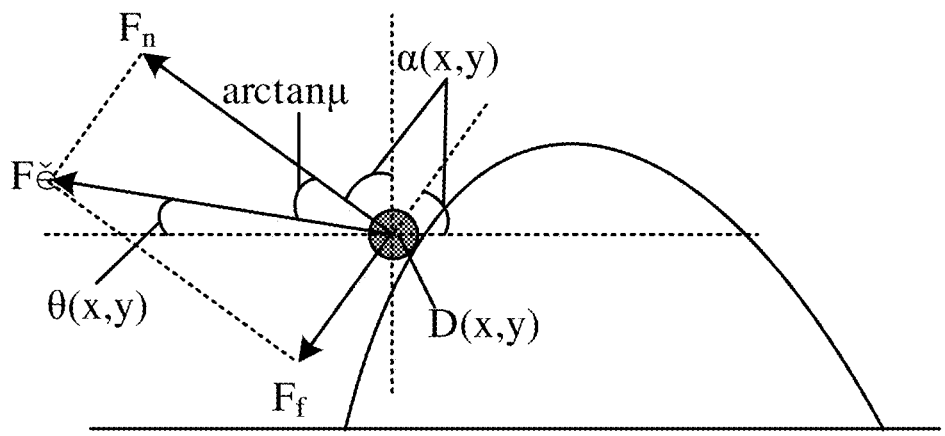
FIG. 9 is a force analysis diagram of a finger touching a visual object according to some embodiments of the present disclosure.

The steps of obtaining the normal force matrix from the tangential force matrix will be described below in conjunction with FIG. 9. As shown in FIG. 9, when a finger touches some point $D(x, y)$ of a visual object, the supporting force of a virtual object that is received by the finger at that point is $F_n$, the friction is $F_f$, the resultant force of these two forces is F', and the computational method for an angle between the resultant force F' and a horizontal plane is $$\theta(x,y) = 90 - \alpha(x,y) - \arctan \mu$$

wherein $\alpha(x, y)$ is calculated as $$\alpha(x, y) = \frac{P_C(x, y)}{255} \times 90°$$

where $\theta(x, y)$ is an element in an xth row and yth column of the angle matrix $\theta$, $\mu$ is a surface friction coefficient of the virtual object;

multiplying an element in the tangent force matrix $F_x$ by the tangent value of an element in the angle matrix $\theta$ at the corresponding location, so as to obtain an element in the normal force matrix $F_y$, an element in an xth row and yth column of the normal force matrix $F_y$ being calculated as $$F_y(x,y) = F_x(x,y) \tan \theta(x,y)$$

In an example of the present disclosure, the first proportional coefficient $k_1$, the second proportional coefficient $k_2$ and the third proportional coefficient $k_3$ may be determined by the following steps.

Figure 7:
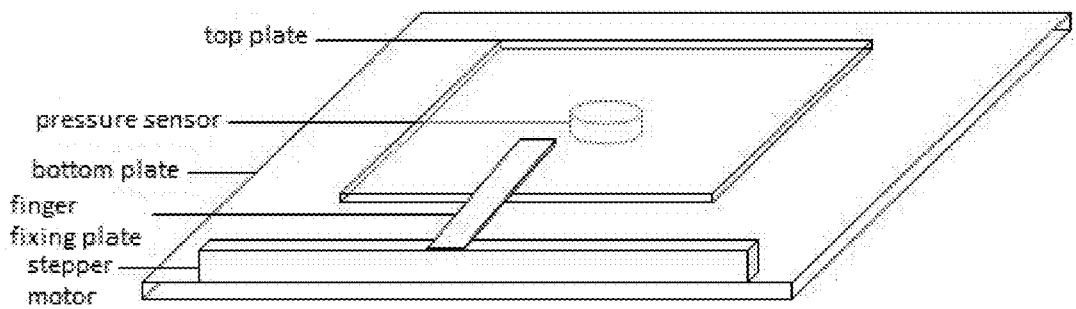
FIG. 7 is a schematic structural diagram of a force measuring platform according to some embodiments of the present disclosure.
Figure 8:
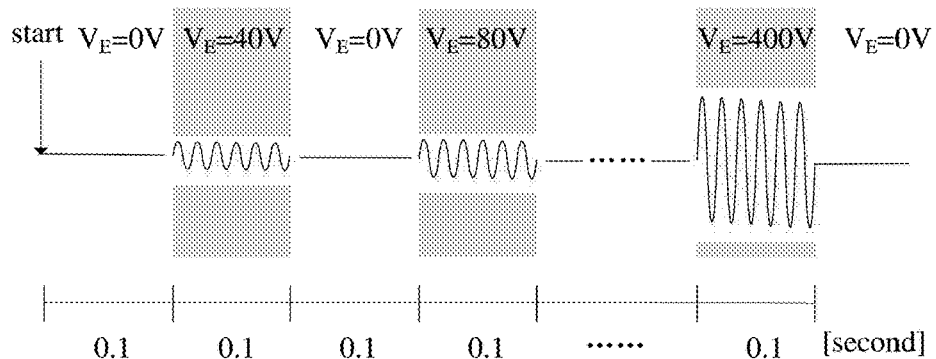
FIG. 8 is diagram illustrating the loading mode of a driving signal when the relationship between the electrostatic friction and a driving voltage is measured according to some embodiments of the present disclosure.

On the basis of the electrostatic tactile feedback, the following quantitative relationship between an electrostatic force driving voltage $V_E$ and tangential electrostatic friction $f_x$ is determined by using a force measuring platform:

$$f_x = k_1 V_E^2$$

where $k_1$ is the first proportional coefficient;

The measuring method of the first proportional coefficient $k_1$ includes: based on the force measuring platform shown in FIG. 7, for example, 12 experimenters (5 men and 7 women, with an average age of 25) are invited to do an electrostatic friction measuring experiment, every experimenter is familiar with the experimental equipment and conducts the experiment with his/her right hand, an electrostatic tactile driving signal is loaded in the manner shown in FIG. 8, the signal frequency is selected as the human sensitive frequency of 120 Hz, the signal amplitude increases from 0V to 400V, and the variance interval is 40V. In order to avoid the influence of differences in the moving speed and pressure of the experimenter's finger on the measurement result, a stepper motor in FIG. 7 is used to control the finger's moving speed, and a finger fixing device is used to control the finger's pressure. During the experiment, for each driving signal amplitude, every experimenter slides his right hand on the touch screen and senses an electrostatic tactile feedback, and a pressure sensor in FIG. 7 is used to measure the tangential friction received by the finger. The above experimental process is repeated for example five times, and the average value of five recorded results is used as the effective data for calculation of a proportional coefficient. The square fitting method is used to process the experimental data, and in a case where the correlative coefficient is 0.9375, a fitting result as illustrated in the following formula is obtained, and as can be seen, the first proportional coefficient $k_1$ is $4 \times 10^{-6}$:

$$f_x = k_1 V_E^2 = 4 \times 10^{-6} V_E^2.$$

Based on the air squeeze-film tactile feedback, the following quantitative relationship between an air squeeze-film driving voltage $V_A$ and a tangential squeeze-film friction $f_y$ is determined by using a force measuring platform:

$$f_y = k_2 V_A^2$$

where $k_2$ is the second proportional coefficient.

The measuring method of the second proportional coefficient $k_2$ includes: the experiment method is similar the method of measuring the proportional coefficient $k_1$, except that the tactile feedback is provided by an air squeeze-film, the signal amplitude increases from 0V to 100V, the variation interval is 10V, and the signal frequency is the resonant frequency of a piezoelectric ceramic sheet. The experimental process is similar to the experimental process of measuring the proportional coefficient $k_1$, and the average value of tactile friction for different signal amplitudes may be obtained by repeating the experiment, for example, five times. The square fitting method is used to process the experimental data, and in a case where the correlative coefficient is 0.9430, a fitting result as illustrated in the following formula can be obtained, and as can be seen, the second proportional coefficient $k_2$ is $3 \times 10^{-5}$;

$$f_y = k_2 V_A^2 = 3 \times 10^{-5} V_A^2;$$

Based on the mechanical vibration tactile feedback, the following quantitative relationship between a mechanical vibration driving voltage $V_V$ and a normal vibration feedback force $f_z$ is determined by using a force measuring platform:

$$f_z = k_3 V_V^2$$

where $k_3$ is the third proportional coefficient;

The measuring method of the third proportional coefficient $k_3$ includes: based on the force measuring platform shown in FIG. 7, the frequency of a driving signal for generating mechanical vibration is selected to be the human sensitive frequency of 220 Hz, the signal amplitude increases from 0V to 160V, and the variance interval is 10V. In the course of the experiment, there is not any experimenter being invited, a touch screen panel in combination with the tactile sensation providing device provided by an embodiment of the present disclosure is fixed to the pressure sensor in FIG. 7. For each amplitude of a vibration driving signal, the pressure sensor can directly measure a tactile feedback force in the normal direction generated by the mechanical vibration. The square fitting method is used to process the experimental data, and in a case where the correlative coefficient is 0.9745, a fitting result as illustrated in the following formula is obtained, and as can be seen, the third proportional coefficient $k_3$ is $3.7 \times 10^5$;

$$f_z = k_3 V_V^2 = 3.7 \times 10^{-5} V_V^2.$$

In some embodiments of the present disclosure, the processing unit 220 is also configured to determine an amplitude of a fourth driving signal for generating the electrostatic force and an amplitude of a fifth driving signal for generating mechanical vibration, based on the information of the texture attribute of the visual object.

In an example of the present disclosure, the processing unit 220 determines the amplitude of the fourth driving signal for generating the electrostatic force and the amplitude of the fifth driving signal for generating the mechanical vibration based on the information of the texture attribute of the visual object by the following steps:

normalizing a curvature matrix C to obtain a normalized curvature matrix $C_N$, an element in an xth row and yth column of the normalized curvature matrix $C_N$ being calculated as follows:

$$C_N(x, y) = \frac{C(x, y) - c_{xmin}}{c_{xmax} - c_{xmin}}$$

where $C(x, y)$ is an element in an xth row and yth column of the curvature matrix C, $c_{x\ min}$ is the minimum value of elements in the curvature matrix C, and $c_{x\ max}$ is the maximum value of elements in the curvature matrix C;

calculating based on the normalized curvature matrix $C_N$ an amplitude matrix $A_{mpE2}$ of the fourth driving signal used for generating the electrostatic force, an element in an xth row and yth column of the amplitude matrix $A_{mpE2}$ being calculated as:

$$A_{mpE2}(x,y) = k_4 V_{E\ max}(1 - C_N(x,y))$$

where $V_{E\ max}$ is the maximum driving voltage which can be provided by the electrostatic tactile feedback, and $k_4$ is the fourth proportional coefficient;

normalizing a texture height matrix $H_T$ to obtain a normalized height matrix $H_N$, an element of which in the xth row and yth column being calculated as $$H_N(x, y) = \frac{H_T(x, y) - h_{xmin}}{h_{xmax} - h_{xmin}}$$

where $H_T(x, y)$ is an element in an xth row and yth column of the texture height matrix $H_T$, $h_{x\ min}$ is the minimum value of elements in the curvature matrix $H_T$, and $h_{x\ max}$ is the maximum value of elements in the curvature matrix $H_T$;

calculating based on the normalized height matrix $H_N$ an amplitude matrix $A_{mpV2}$ of the fifth driving signal used for generating the mechanical vibration, an element in an xth row and yth column of the amplitude matrix $A_{mpV2}$ being calculated as $$A_{mpV2}(x,y) = k_6 V_{V\ max} H_N(x,y)$$

where $V_{V\ max}$ is the maximum driving voltage which can be provided by the vibration tactile feedback, and $k_6$ is the sixth proportional coefficient.

In an example of the present disclosure, the fourth proportional coefficient $k_4$ and the sixth proportional coefficient $k_6$ may be determined by the following steps.

Based on tactile feedback of the electrostatic force and the air squeeze-film, a perception model between the perception strength of the tangential friction and the amplitude of the driving signal is established as $$Y_E = k_4 V_E + a$$

$$Y_A = k_5 V_A + b$$

where $Y_E$ and $Y_A$ are the perception strength of the tangential friction of electrostatic tactile feedback and the perception strength of the tangential friction of air squeeze-film tactile feedback, respectively, $V_E$ and $V_A$ are driving voltage amplitudes of the tactile feedback of the electrostatic force and the air squeeze-film, respectively, and $k_4$, $k_5$, a and b are all constants;

the measuring method of constants $k_4$, $k_5$, a and b includes: in the tactile sensation providing device according to the embodiments of the present disclosure, the maximum tangential friction produced by electrostatic tactile feedback is approximately three times as much as the maximum tangential friction produced by air squeeze-film tactile feedback, and therefore, when the friction perception strength is divided into 100 levels, the air squeeze-film tactile perception strength is from 0 to 25, and the electrostatic tactile perception strength is from 25 to 100. An air squeeze-film tactile driving signal is selected be a sine wave, the frequency is the piezoelectric ceramic resonance frequency, the amplitude changes from 53.5V (perceptual absolute threshold) to 100V, and the variation interval is 5V. A driving signal used for generating the electrostatic force is selected to be a sine wave, the frequency is the human sensitive frequency of 120 Hz, the amplitude changes from 35.5V (perceptual absolute threshold) to 400V, and the variation interval is 40V. For example, 12 experimenters (5 men and 7 women, with an average age of 25) are invited to do the perception experiment. For each driving signal amplitude, every experimenter moves his/her marked finger on the touch screen panel and senses the tactile friction, and gives a corresponding subjective perception strength score based on the perceived friction. According to the relationship between the perception strength scoring result and the driving voltage, the experimental data are processed by a linear fitting method, and a fitting result with a correlative coefficient higher than 0.9 as follows can be obtained:

$$Y_E=k_4V_E+a=0.21V_E+18.18$$

$$Y_A=k_5V_A+b=-0.51V_A+50.87$$

Thus, the fourth proportional coefficient $k_4$ is 0.21;

Based on electrostatic tactile feedback, a perception model between the tangential friction perception strength $Y_F$ and the frequency of the driving signal $F_E$ is established as $$Y_F=k_6F_E+c$$

where both $k_6$ and d are constants.

The measuring method of constants $k_6$ and c includes: the friction perception strength for different frequencies of an electrostatic force driving signal is divided into 100 levels, the driving signal is selected to be a sine wave, the amplitude is 200V, the frequency changes from 100 Hz to 1000 Hz, and the variation interval is 100 Hz. Based on the force measuring platform shown in FIG. 7, for example, 12 experimenters (5 men and 7 women, with an average age of 25) are invited to do the perceptual experiment. For each driving signal frequency, every the experimenter moves his/her marked finger on the touch screen panel and senses the tactile friction, and gives a corresponding subjective perception strength score based on the perceived friction. According to the relationship between the perception strength scoring result and the driving frequency, the experimental data are processed by a linear fitting method, and a fitting result with a correlative coefficient higher than 0.9 as illustrated below can be obtained and thus the sixth proportional coefficient $k_6$ is −0.1:

$$Y_F=k_6F_E+c=-0.1F_E+112.15$$

In some embodiments of the present disclosure, the processing unit 220 is also configured to determine a frequency of a driving signal for generating the electrostatic force, based on the information of the roughness attribute of the visual object.

In an example of an embodiment of the present disclosure, the processing unit 220 may determine the frequency of a driving signal for generating the electrostatic force based on the information of the roughness attribute of the visual object by the following steps:

normalizing a curvature matrix C to obtain a normalized curvature matrix $C_N$, an element of which in the xth row and yth column being calculated as $$C_N(x,y) = \frac{C(x,y)-c_{xmin}}{c_{xmax}-c_{xmin}}$$

where C(x, y) is an element of the curvature matrix C in the xth row and yth column, $c_{x\ min}$ is the minimum value of elements in the curvature matrix C, and $c_{x\ max}$ is the maximum value of elements in the curvature matrix C;

calculating based on the normalized curvature matrix $C_N$ an frequency matrix $F_{EC}$ of the driving signal used for generating the electrostatic force, an element in the xth row and yth column of the frequency matrix $F_{EC}$ being calculated as:

$$F_{EC}(x,y)=k_7f_{E\ max}C_N(x,y)$$

where $f_{E\ max}$ is the maximum frequency which is provided by the electrostatic tactile feedback, and $k_7$ is the seventh proportional coefficient.

In an example of the present disclosure, the seventh proportional coefficient $k_7$ may be determined by the following steps:

based on mechanical vibration tactile feedback, establishing a perception model between the perception strength $Y_V$ in the normal direction and the amplitude of a driving signal $V_V$ as $$Y_V=k_7V_V+d$$

where both $k_7$ and d are constants.

The measuring method of constants $k_7$ and d includes: the perception strength for different amplitudes of a driving signal for generating the mechanical vibration is divided into 100 levels, the driving signal is selected to be a sine wave, the frequency is the human sensitive frequency of 220 Hz, the amplitude changes from 31V (perceptual absolute threshold) to 148V, and the variation interval is 13V. For example, 12 experimenters (5 men and 7 women, with an average age of 25) are invited to do the perceptual experiment. For each amplitude of the driving signal for generating the mechanical vibration, every experimenter moves his/her marked finger on the touch screen panel and senses the change in normal feedback force, and gives a corresponding subjective perception strength score based on the perceived size of the normal feedback force. According to the relationship between the perception strength scoring result and the driving signal amplitude, the experimental data are processed by a linear fitting method, and a fitting result with a correlative coefficient higher than 0.9 as illustrated below can be obtained, and thus the seventh proportional coefficient $k_7$ is 0.88:

$$Y_V=k_7V_V+d=0.88V_V-26.15$$

The tactile sensation providing method provided by an embodiment of the present disclosure provides a tactile sensation that fuses the electrostatic force, the air squeeze-film and the mechanical vibration. The dynamic range of the tangential friction is extended by providing the electrostatic force and the air squeeze-film effect simultaneously, and the tactile feedback force in the normal direction is added by providing the mechanical vibration. Consequently, simultaneous extension of the dynamic range and dimensions of the tactile feedback force on a touch screen is realized. Furthermore, contour tactile sensation reproduction, texture tactile sensation reproduction, and roughness tactile sensation reproduction are realized by the tactile sensation providing method provided by an embodiment of the present invention, and the reality and richness of the tactile sensation are significantly improved.

As can be understood by those skilled in the art, units or modules described in embodiments of this application (including, but not limited to, processing units, driving units, etc.) may be implemented in hardware, software, firmware or any combination thereof. If implemented in software, these functions may serve as one or more instructions or codes stored on or transmitted by a computer-readable medium. The computer-readable medium includes a computer-readable storage medium. The computer-readable storage medium may be any available storage medium that can be accessed by a computer. As an example, but without any limitation, such a computer-readable medium may include Random Access Memory (RAM), Read Only Memory (ROM), Electrically Erasable Programmable Read Only Memory (EEPROM), Compact Disc-ROM (CD-ROM) or other optical disk storage, magnetic disk storage or other magnetic storage device, or any other medium that can be used to carry or store instructions or desired program codes in the form of data structure and can be accessed by a computer. In addition, the transmitted signal may not belong to the computer-readable storage media. The computer-readable medium also includes a communication medium, which includes any medium that facilitates the transfer of computer programs from one place to another place. A connection may be implemented via, for example, a communication medium. For example, if the software is configured to acquire data from a web website, a server or other remote source by using a coaxial cable, a fiber optic cable, a twisted-pair cable, a digital subscriber line (DSL), or a wireless technology such as infrared, radio, and microwave, the communication medium may include the coaxial cable, the fiber optic cable, the twisted-pair cable, the DSL, or the wireless technology such as infrared, radio, and microwave, as well as any combination thereof. Alternatively or optionally, the functions described here may be performed at least partly by one or more hardware logic components. For example, the illustrative type of hardware logic components that can be used includes a field programmable gate array (FPGA), an application specific integrated circuit (ASIC), an application specific standard product (ASSP), a system on chip (SOC), a complex programmable logic device (CPLD) and so on.

The performance of the tactile sensation providing method based on the contour, texture, roughness of a visual object as set forth in the present disclosure will be further analyzed below by experimental examples.

The experimental equipment is a tactile sensation providing device provided by an embodiment of the present disclosure. In the course of the experiment, the method proposed in the present disclosure is abbreviated as EUMV method, an existing tactile sensation providing method fusing an electrostatic force and mechanical vibration is abbreviated as EMV method, an existing tactile sensation providing method fusing an electrostatic force and an air squeeze-film is abbreviated as EUV method. Among them, the EMV method and the EUV method are used as comparative methods to evaluate the improving effect of tactile perception reality of the EUMV method presented in the present disclosure.

Figure 10:
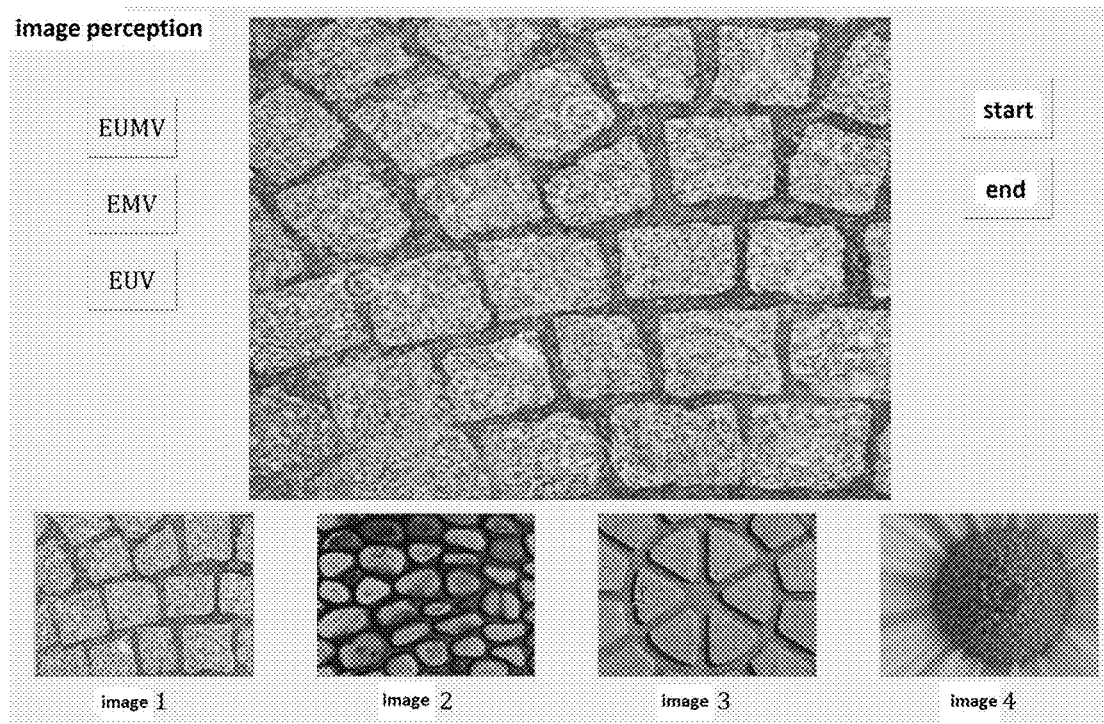
FIG. 10 is a diagram illustrating an interface for a subjective evaluation experiment of reality of perceived tactile sensations according to some embodiments of the present disclosure.

The subjective evaluation experiment includes: the experimental interface is shown in FIG. 10, and the tactile interaction interface of the tactile sensation providing device provided by an embodiment of the present disclosure is divided into two regions, which are a selecting region and a sensing region, respectively. In the image selecting region, four pictures from a STEX texture library are sequentially marked as image 1, image 2, image 3, and image 4; in the sensing region, the EUMV method, the EMV method, and the EUV method may be chosen at random to achieve the tactile sensation provision of a corresponding image. The tactile perception reality is obtained in the form of a subjective questionnaire, the question provided in the questionnaire is "how much would you rate the tactile reality of each of the tactile sensation providing methods?" Degrees of tactile perception reality are divided by using a Likert Scale, and are totally divided into ten levels, while 10 means that the perception reality is the strongest, and 1 means that the perception reality is the weakest. In the experiment, for example, 20 experimenters (9 men and 11 women, with an average age of 26) are invited to participate in the experiment, and all the experimenters are familiar with the experimental equipment and the experimental task through a preparatory experiment, and know the differences in the tactile perception reality of different tactile sensation providing methods.

The experimental process is divided into four stages, and the subjective assessment of tactile perception reality of four images is realized separately. Taking the first stage as an example, image 1 appears in the sensing region, the EUMV method, the EMV method, and the EUV method are respectively loaded to that image so as to realize a corresponding tactile perception, and all the experimenters touch the sensing region with their marked fingers and rate the tactile sensation providing reality of each tactile sensation providing method. Each tactile sensation providing method appears randomly 5 times, the three tactile sensation reproduction methods appear 15 times in total, and then each experimenter carry out rating 15 times Similar to the experimental process at the first stage, the stage 2, stage 3 and stage 4 are performed sequentially, and the subjective evaluation of the tactile perception reality of image 2, image 3, and image 4 can be achieved, respectively.

On the basis of the recorded subjective evaluation results, the mean and standard deviation of perception reality scores given to four images by the three tactile sensation providing methods are calculated, as shown in Table 1.

TABLE 1

Table of mean and standard deviation of perception reality scores of four images with respect to three tactile sensation providing methods

| | EUMV method | | EMV method | | EUV method | |
| --- | --- | --- | --- | --- | --- | --- |
| image | mean | standard deviation | mean | standard deviation | mean | standard deviation |
| image 1 | 7.175 | 1.970 | 4.925 | 1.608 | 5.170 | 2.526 |
| image 2 | 6.960 | 2.198 | 5.240 | 1.857 | 4.730 | 2.657 |
| image 3 | 7.535 | 1.652 | 5.075 | 2.028 | 4.825 | 2.860 |
| image 4 | 7.275 | 1.666 | 4.850 | 1.954 | 4.900 | 2.222 |

It can be seen that the mean of scores of tactile perception reality given to each of the four images for the EUMV method proposed by the present disclosure is higher than that of the EMV method and the EUV method, that is to say, the tactile perception reality of the proposed method is higher. In the aspect of standard deviation, the standard deviation of subjective scores of image 3 and image 4 for the proposed EUMV method is obviously smaller than those of the other two methods, and this just shows that the corresponding experimental data are more stable.

With the use of a SPSS software, a variance analysis method (ANOVA) is used to make a statistical significance analysis of the experimental data, and the results are shown in Table 2.

TABLE 2

Table of statistical significance analysis of experimental
data through variance analysis method (ANOVA)

| image | EUMV and EMV significance analysis | | EUMV and EUV significance analysis | |
|---|---|---|---|---|
| | F | significance factor p | F | significance factor p |
| image 1 | 13.759 | 0.014 | 6.796 | 0.012 |
| image 2 | 7.247 | 0.031 | 11.185 | 0.015 |
| image 3 | 17.689 | 0.020 | 13.902 | 0.010 |
| image 4 | 17.636 | 0.011 | 14.830 | 0.009 |

It can be seen that corresponding significance factors p are all less than 0.05, that is to say, compared with the EMV method and the EUV method, the EUMV method provided by the embodiments of the present disclosure has a significant improvement in the tactile perception reality of each of four images.

Although the present disclosure has been described above in detail with general illustration and particular embodiments, it is obvious to those skilled in the art that some modifications or improvements can be made on the basis of embodiments of the present disclosure. Therefore, these modifications or improvements made without departing from the present disclosure all fall within the protection scope of the present disclosure.

The foregoing merely are exemplary embodiments of the disclosure, and not intended to define the scope of the disclosure, and the scope of the disclosure is determined by the appended claims.

What is claimed is:

1. A tactile sensation providing method, comprising:
generating a first tactile sensation based on information of a contour attribute of a visual object;
generating a second tactile sensation based on information of a texture attribute of the visual object; and
generating a third tactile sensation based on information of a roughness attribute of the visual object,
wherein the tactile sensation providing method, further comprising comprises:
obtaining the information of the contour attribute, the information of the texture attribute and the information of the roughness attribute of the visual object, based on color information of the visual object.

2. The tactile sensation providing method according to claim 1, wherein the obtaining the information of the contour attribute, the information of the texture attribute and the information of the roughness attribute of the visual object, based on the color information of the visual object comprises:
converting each pixel of the visual object from an RGB color model to an HSI color model by equations (1) to (4):

$$H = \begin{cases} \bar{\omega} & B \leq G \\ 2\pi - \bar{\omega} & B > G \end{cases} \quad (1)$$

$$S = 1 - \frac{3}{R+G+B}[\min(R, G, B)] \quad (2)$$

$$I = \frac{1}{3}(R + G + B) \quad (3)$$

where R is a red color value, G is a green color value, and B is a blue color value, H is hue, S is saturation, I is brightness, and $\bar{\omega}$ is a radian for partition of different main hues, $$\bar{\omega} = \arccos\left\{ \frac{(R-G)+(R-B)}{2[(R-G)^2+(R-G)(G-B)]^{1/2}} \right\}; \quad (4)$$

calculating a gradient matrix P by using the brightness I as a height matrix $H_{EI}$, wherein an element in an xth row and a yth column of the gradient matrix P is expressed as:

$$P(x,y) = \sqrt{[\Delta_x H_{EI}(x,y)]^2 + [\Delta_y H_{EI}(x,y)]^2}$$

where $\Delta_x$ and $\Delta_y$ are partial derivatives of the height matrix $H_{EI}$ with respect to x and y, respectively, $H_{EI}(x,y)$ is an element in an xth row and a yth column of the height matrix $H_{EI}$, $1 \leq x \leq M$, $1 \leq y \leq N$, M is a number of pixel rows of the visual object, and N is a number of pixel columns of the visual object;

calculating a texture height matrix $H_T$ associated with the texture attribute and a contour gradient matrix $P_C$ associated with the contour attribute, wherein elements in an xth row and a yth column of the texture height matrix $H_T$ and the contour gradient matrix $P_C$ are respectively expressed as:

$$H_T(x,y) = H_{EI}(x,y) \odot S_M(x,y)$$

$$P_C(x,y) = P(x,y) - P(x,y) \odot S_M(x,y)$$

wherein $$S_M(x, y) = \begin{cases} 0 & P(x, y) > p \\ 1 & P(x, y) \leq p \end{cases}$$

where $S_M(x,y)$ is an element in an xth row and a yth column of a matrix $S_M$ for differentiation of a contour gradient and a texture gradient, symbol $\odot$ is a Schur operation, and P is an empirical gradient value for partition of the contour attribute and the texture attribute; and obtaining, based on the texture height matrix $H_T$, a curvature matrix C associated with the texture attribute and the roughness attribute by using a curvature convolution kernel, wherein an element in an xth row and a yth column of the curvature matrix C is calculated as:

$$C(x, y) = \frac{LW - K^2}{EQ - Z^2}$$

where E, Q and Z are first-order convolution kernel coefficients of an element $H_T(x,y)$ in an xth row and a yth column of the texture height matrix, and L, W and K are second-order convolution kernel coefficients of the element $H_T(x,y)$ in the xth row and the yth column of the texture height matrix $H_T$.

3. The tactile sensation providing method according to claim 2, wherein the generating the first tactile sensation based on the information of the contour attribute of the visual object comprises:
generating the first tactile sensation by an electrostatic force, an air squeeze-film effect and a mechanical vibration, based on the information of the contour attribute of the visual object.

4. The tactile sensation providing method according to claim 3, wherein the generating the first tactile sensation by the electrostatic force, the air squeeze-film effect and the mechanical vibration, based on the information of the contour attribute of the visual object comprises:

determining an amplitude of a first driving signal for generating the electrostatic force, an amplitude of a second driving signal for generating the air squeeze-film effect, and an amplitude of a third driving signal for generating the mechanical vibration, based on the information of the contour attribute of the visual object; and generating the electrostatic force by the first driving signal, generating the air squeeze-film effect by the second driving signal, and generating the mechanical vibration by the third driving signal, so as to generate the first tactile sensation.

5. The tactile sensation providing method according to claim 4, wherein the determining the amplitude of the first driving signal for generating the electrostatic force, the amplitude of the second driving signal for generating the air squeeze-film effect, and the amplitude of the third driving signal for generating the mechanical vibration, based on the information of the contour attribute of the visual object comprises:

normalizing the contour gradient matrix $P_C$ obtain a normalized contour gradient matrix $P_N$, wherein an element in an xth row and a yth column of the normalized contour gradient matrix $P_N$ is calculated as:

$$P_N(x, y) = \frac{P_C(x, y) - p_{min}}{p_{max} - p_{min}}$$

where $P_C(x,y)$ is an element in an xth row and a yth column of the contour gradient matrix $P_C$, $\rho_{xmin}$ is a minimum value of elements in the contour gradient matrix $P_C$, $\rho_{xmax}$ is a maximum value of elements in the contour gradient matrix $P_C$, $1 \le x \le M$, $1 \le y \le N$;

calculating a tangential force matrix $F_x$ based on the normalized gradient matrix $P_N$, wherein an element in an xth row and a yth column of the tangential force matrix $F_x$ is calculated as:

$F_x(x,y) = (f_o - f_a) + P_N(x,y)(f_e + f_a)$ where $f_o$ is a tangential force received by a finger when the finger sweeps over a device screen without applying tactile feedback, $f_e$ is a maximum tangential force which is capable of being increased by the electrostatic tactile sensation, and $f_a$ is a maximum tangential force which is capable of being decreased by the air squeeze-film tactile sensation;

decomposing the tangential force matrix $F_x$ into an electrostatic force matrix $F_{xE}$ and an air squeeze-film force matrix $F_{xA}$, wherein elements in an xth row and a yth column of the electrostatic force matrix $F_{xE}$ and the air squeeze-film force matrix $F_{xA}$ are respectively calculated as:

$$F_{xE}(x, y) = \begin{cases} F_x(x, y) - f_o & F_x(x, y) > f_o \\ 0 & F_x(x, y) \le f_o \end{cases}$$

-continued $$F_{xA}(x, y) = \begin{cases} f_o - F_x(x, y) & F_x(x, y) < f_o \\ 0 & F_x(x, y) \ge f_o \end{cases};$$

calculating an amplitude matrix $A_{mpE1}$ of the first driving signal for generating the electrostatic force based on the electrostatic force matrix $F_{xE}$, wherein an element in an xth row and a yth column of the amplitude matrix $A_{mpE1}$ is calculated as:

$A_{mpE1}(x,y) = \sqrt{F_{xE}(x,y)/k_1}$ where $k_1$ is a first proportional coefficient;

calculating an amplitude matrix $A_{mpA}$ of the second driving signal for generating the air squeeze-film effect based on the air squeeze-film force matrix $F_{xA}$, wherein an element in an xth row and a yth column of the amplitude matrix $A_{mpA}$ is calculated as:

$A_{mpA}(x,y) = \sqrt{F_{xA}(x,y)/k_2}$, where $k_2$ is a second proportional coefficient;

calculating a normal force matrix $F_y$ based on the tangential force matrix $F_x$, wherein an element in an xth row and a yth column of the normal force matrix $F_y$ is calculated as:

$F_y(x,y) = F_x(x,y) \tan\theta(x,y)$ where $\theta(x,y)$ represents an angle between a horizontal plane and a resultant force of a supporting force and friction that are received by a finger at a point $D(x,y)$ of the visual object when the finger touches the point, and is calculated by a following formula:

$\theta(x,y) = 90 - \alpha(x,y) - \arctan\mu$ where $\alpha(x,y)$ is calculated as $$\alpha(x, y) = \frac{P_C(x, y)}{255} \times 90°,$$

$\mu$ is a surface friction coefficient of the visual object; and calculating an amplitude matrix $A_{mpV1}$ of the third driving signal for generating the mechanical vibration based on the normal force matrix $F_y$, wherein an element in an xth row and a yth column of the amplitude matrix $A_{mpV1}$ is calculated as:

$A_{mpV1}(x,y) = \sqrt{F_y(x,y)/k_3}$, where $k_3$ is a third proportional coefficient.

6. The tactile sensation providing method according to claim 3, wherein the electrostatic force is provided by supplying a driving signal to an electrically conductive plate.

7. The tactile sensation providing method according to claim 3, wherein the mechanical vibration is provided by supplying a driving signal to a vibrating element.

8. The tactile sensation providing method according to claim 3, wherein the air squeeze-film effect is provided by supplying a driving signal to a piezoelectric element.

9. The tactile sensation providing method according to claim 2, wherein the generating the second tactile sensation based on the information of the texture attribute of the visual object comprises:

generating the second tactile sensation by an electrostatic force and a mechanical vibration, based on the information of the texture attribute of the visual object.

10. The tactile sensation providing method according to claim 9, wherein the generating the second tactile sensation by the electrostatic force and the mechanical vibration, based on the information of the texture attribute of the visual object comprises:

determining an amplitude of a fourth driving signal for generating the electrostatic force and an amplitude of a fifth driving signal for generating the mechanical vibration, based on the information of the texture attribute of the visual object; and generating the electrostatic force by the fourth driving signal and generating the mechanical vibration by the fifth driving signal, so as to generate the second tactile sensation.

11. The tactile sensation providing method according to claim 10, wherein the determining the amplitude of the fourth driving signal for generating the electrostatic force and the amplitude of the fifth driving signal for generating the mechanical vibration, based on the information of the texture attribute of the visual object comprises:

normalizing the curvature matrix C to obtain a normalized curvature matrix $C_N$, wherein an element in an xth row and a yth column of the normalized curvature matrix $C_N$ is calculated as:

$$C_N(x, y) = \frac{C(x, y) - c_{xmin}}{c_{xmax} - c_{xmin}}$$

where C(x,y) is an element in an xth row and a yth column of the curvature matrix C, $c_{xmin}$ is a minimum value of elements in the curvature matrix C, and $c_{xmax}$ is a maximum value of elements in the curvature matrix C;

calculating an amplitude matrix $A_{mpE2}$ of the fourth driving signal for generating the electrostatic force based on the normalized curvature matrix $C_N$, wherein an element in an xth row and a yth column of the amplitude matrix $A_{mpE2}$ is calculated as:

$A_{mpE2}(x,y) = k_4 V_{Emax}(1 - C_N(x,y))$ where $V_{Emax}$ is a maximum driving voltage which is capable of being provided by electrostatic tactile feedback, and $k_4$ is a fourth proportional coefficient;

normalizing the texture height matrix $H_T$ to obtain a normalized height matrix $H_N$, wherein an element in an xth row and a yth column of the normalized height matrix $H_N$ is calculated as:

$$H_N(x, y) = \frac{H_T(x, y) - h_{xmin}}{h_{xmax} - h_{xmin}}$$

where $H_T(x,y)$ is an element in an xth row and a yth column of the texture height matrix $H_T$, $h_{xmin}$ is a minimum value of elements in the curvature matrix $H_T$, and $h_{xmax}$ is a maximum value of elements in the curvature matrix $H_T$; and calculating an amplitude matrix $A_{mpV2}$ of the fifth driving signal for generating the mechanical vibration based on the normalized height matrix $H_N$, wherein an element in an xth row and a yth column of the amplitude matrix $A_{mpV2}$ is calculated as:

$A_{mpV2}(x,y) = k_6 V_{Vmax} H_N(x,y)$ where $V_{Vmax}$ a maximum driving voltage which is capable of being provided by vibration tactile feedback, and $k_6$ is a sixth proportional coefficient.

12. The tactile sensation providing method according to claim 2, wherein the generating the third tactile sensation based on the information of the roughness attribute of the visual object comprises:

generating the third tactile sensation by an electrostatic force, based on the information of the roughness attribute of the visual object.

13. The tactile sensation providing method according to claim 12, wherein the generating the third tactile sensation by the electrostatic force, based on the information of the roughness attribute of the visual object comprises:

determining a frequency of a driving signal for generating the electrostatic force, based on the information of the roughness attribute of the visual object; and generating the electrostatic force by the driving signal, so as to generate the third tactile sensation.

14. The tactile sensation providing method according to claim 13, wherein the determining the frequency of the driving signal for generating the electrostatic force, based on the information of the roughness attribute of the visual object comprises:

normalizing the curvature matrix C to obtain a normalized curvature matrix $C_N$, wherein an element in an xth row and a yth column of the normalized curvature matrix $C_N$ is calculated as:

$$C_N(x, y) = \frac{C(x, y) - c_{xmin}}{c_{xmax} - c_{xmin}}$$

where C(x,y) is an element in an xth row and a yth column of the curvature matrix C, $c_{xmin}$ is a minimum value of elements in the curvature matrix C, $C_{xmax}$ is a maximum value of elements in the curvature matrix C; and calculating a frequency matrix $F_{EC}$ of the driving signal for generating the electrostatic force based on the normalized curvature matrix $C_N$, wherein an element in an xth row and a yth column of the frequency matrix $F_{EC}$ is calculated as:

$F_{EC}(x,y) = k_7 f_{Emax} C_N(x,y)$ where $f_{Emax}$ is a highest frequency which is provided by electrostatic tactile feedback, and $k_7$ is a seventh proportional coefficient.

15. A tactile sensation providing device, comprising a tactile sensation providing unit, configured to generate a first tactile sensation based on information of a contour attribute of a visual object; to generate a second tactile sensation based on information of a texture attribute of the visual object; to generate a third tactile sensation based on information of a roughness attribute of the visual object; and to provide a combination of the first tactile sensation, the second tactile sensation and the third tactile sensation;

a processing unit, generating a driving signal parameter based on the information of the contour attribute, the information of the texture attribute and the information of the toughness attribute of the visual object; and a driving unit, in a communication connection with the processing unit and the tactile sensation providing unit, and receiving the driving signal parameter from the processing unit, so as to generate a driving signal for driving the tactile sensation providing unit based on the driving signal parameter.

16. The tactile sensation providing device according to claim 15, wherein the tactile sensation providing unit comprises:

an electrostatic force element for generating an electrostatic force;

a piezoelectric element for generating an air squeeze-film effect; and a vibrating element for generating a mechanical vibration.

17. The tactile sensation providing device according to claim 16, wherein the processing unit is configured to:

determine, based on the information of the contour attribute of the visual object, an amplitude of a first driving signal for driving the electrostatic force element to generate the electrostatic force, an amplitude of a second driving signal for driving the piezoelectric element to generate the air squeeze-film effect and an amplitude of a third driving signal for driving the vibrating element to generate the mechanical vibration.

18. The tactile sensation providing device according to claim 16, wherein the processing unit is configured to:

determine, based on the information of the texture attribute of the visual object, an amplitude of a fourth driving signal for driving the electrostatic force element to generate the electrostatic force and an amplitude of a fifth driving signal for driving the vibrating element to generate the mechanical vibration.

19. The tactile sensation providing device according to claim 15, wherein the processing unit is configured to:

determine, based on the information of the roughness attribute of the visual object, a frequency of a driving signal for driving the electrostatic force element to generate the electrostatic force.

* * * * *

UNITED STATES PATENT AND TRADEMARK OFFICE
CERTIFICATE OF CORRECTION

PATENT NO. : 11,334,162 B2
APPLICATION NO. : 16/644874
DATED : May 17, 2022
INVENTOR(S) : Xiaoying Sun et al.

It is certified that error appears in the above-identified patent and that said Letters Patent is hereby corrected as shown below:

In the Claims

At Column 29, Line 42, "method," should be -- method --.

At Column 29, Line 43, "comprising comprises:" should be -- comprises: --.

At Column 31, Line 29, "$P_C$ obtain" should be -- $P_C$ to obtain --.

At Column 31, Line 50, "$f_o$is" should be -- $f_o$ is --.

At Column 31, Line 39, "$ρ_{xmin}$" should be -- $p_{xmin}$ --.

At Column 31, Line 41, "$ρ_{xmax}$" should be -- $p_{xmax}$ --.

At Column 32, Line 11, "$A_{mpE1}(x,y) = \sqrt{F_{xE}(x,y)/k_1}$," should be -- $A_{mpE1}(x,y) = \sqrt{F_{xE}(x,y)/k_1}$, --.

At Column 32, Line 20, "$A_{mpA}(x,y) = \sqrt{F_{xA}(x,y)/k_2}$," should be -- $A_{mpA}(x,y) = \sqrt{F_{xA}(x,y)/k_2}$, --.

At Column 32, Line 27, "$F_y(x,y) = F_x(x,y)\tan\theta(x,y)$" should be -- $F_y(x,y) = F_x(x,y)\tan\theta(x,y)$ --.

At Column 32, Line 34, "$\theta(x,y) = 90 - \alpha(x,y) - \arctan\mu$" should be -- $\theta(x,y) = 90 - \alpha(x,y) - \arctan\mu$ --.

At Column 32, Line 49, "$A_{mpY1}(x,y) = \sqrt{F_y(x,y)/k_3}$," should be -- $A_{mpY1}(x,y) = \sqrt{F_y(x,y)/k_3}$, --.

At Column 33, Line 40, "$A_{mpE2}(x,y) = k_4 V_{Emax}(1 - C_N(x,y))$" should be
-- $A_{mpE2}(x,y) = k_4 V_{E\,max}(1 - C_N(x,y))$ --.

At Column 33, Line 41, "$V_{Emax}$" should be -- $V_{E\,max}$ --.

Signed and Sealed this
Thirteenth Day of December, 2022

Katherine Kelly Vidal
*Director of the United States Patent and Trademark Office*

CERTIFICATE OF CORRECTION (continued)
U.S. Pat. No. 11,334,162 B2

At Column 33, Line 61, "$H_N$ ," should be -- $H_N$, --.

At Column 33, Line 64, "$A_{mpV2}(x,y)=k_6V_{Vmax}H_N(x,y)$" should be -- $A_{mpV2}(x,y)=k_6V_{V\,max}H_N(x,y)$ --.

At Column 33, Line 65, "$V_{Vmax}$ a" should be -- $V_{V\,max}$ is a --.

At Column 34, Line 33, "$C_{xmax}$" should be -- and $c_{xmax}$ --.

At Column 34, Line 41, "$F_{EC}(x,y)=k_7f_{Emax}C_N(x,y)$" should be -- $F_{EC}(x,y)=k_7f_{E\,max}C_N(x,y)$ --.

At Column 34, Line 42, "$f_{Emax}$" should be -- $f_{E\,max}$ --.